US012772109B2

(12) United States Patent
Elazzouni et al.

(10) Patent No.: US 12,772,109 B2
(45) Date of Patent: Oct. 20, 2026

(54) MULTIPLE CONCATENATION BUFFERS AT A PACKET DATA CONVERGENCE PROTOCOL LAYER

(71) Applicant: QUALCOMM Incorporated, San Diego, CA (US)

(72) Inventors: Sherif Elazzouni, San Diego, CA (US); Ozcan Ozturk, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 272 days.

(21) Appl. No.: 18/535,932

(22) Filed: Dec. 11, 2023

(65) Prior Publication Data

US 2025/0193734 A1 Jun. 12, 2025

(51) Int. Cl.
*G06F 15/173* (2006.01)
*H04W 28/06* (2009.01)

(52) U.S. Cl.
CPC ................................. *H04W 28/065* (2013.01)

(58) Field of Classification Search
CPC ....... H04L 69/22; H04L 47/34; H04L 69/324; H04W 28/065; H04W 80/02
See application file for complete search history.

(56) References Cited

U.S. PATENT DOCUMENTS

2007/0019553 A1* 1/2007 Sagfors .................. H04L 65/80 370/236
2009/0135718 A1* 5/2009 Yeo ...................... H04L 1/1874 370/225
2009/0290598 A1* 11/2009 Pani ..................... H04L 1/1874 370/473

(Continued)

FOREIGN PATENT DOCUMENTS

KR 20220063695 A 5/2022
WO WO-2023029013 A1 3/2023
WO WO-2023054954 A1 4/2023

OTHER PUBLICATIONS

International Search Report and Written Opinion—PCT/US2024/058249—ISA/EPO—Feb. 28, 2025.

*Primary Examiner* — Duyen M Doan
(74) *Attorney, Agent, or Firm* — Holland & Hart LLP

(57) ABSTRACT

Methods, systems, and devices for wireless communications are described. The described techniques provide for a transmitting device to concatenate one or more sets of service data units (SDUs) at a packet data convergence protocol (PDCP) layer and perform PDCP processing on the concatenated SDUs. The transmitting device may identify multiple SDUs at the PDCP layer and may input the SDUs into one or more concatenation buffers of the transmitting device. The transmitting wireless device may use one or more concatenation buffers associated with respective configurations for concatenating SDUs. For example, the one or more concatenation buffers may each be configured to concatenate (Continued)

SDUs until reaching a threshold size, a concatenation timer expiring, or both. Additionally, or alternatively, the one or more concatenation buffers may be configured to concatenate SDUs according to a radio link control (RLC) entity, a quality of service (QoS) flow, or both.

30 Claims, 14 Drawing Sheets

(56) References Cited

U.S. PATENT DOCUMENTS

2012/0140704 A1* 6/2012 Zhao .................... H04L 1/1809
370/315
2018/0343584 A1* 11/2018 Yi ...................... H04W 28/065
2019/0098544 A1* 3/2019 Han ................. H04W 36/0044
2023/0090572 A1* 3/2023 Ostwal ............... H04W 28/065
370/329
2023/0413108 A1* 12/2023 Eskelinen ............ H04L 1/1854

* cited by examiner

MULTIPLE CONCATENATION BUFFERS AT A PACKET DATA CONVERGENCE PROTOCOL LAYER

FIELD OF TECHNOLOGY

The following relates to wireless communications, including multiple concatenation buffers at a packet layer convergence protocol (PDCP) layer.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, wireless devices may process data for communications (e.g., transmission or reception) according to layers of a protocol stack. In some cases, such layers may be associated with various functionalities and signaling. For example, the protocol stack may include a packet layer convergence protocol (PDCP) layer, which may support integrity protection, ciphering, or both on data packets received at the PDCP layer.

SUMMARY

The described techniques relate to improved methods, systems, devices, and apparatuses that support multiple concatenation buffers at a packet layer convergence protocol (PDCP) layer. For example, the described techniques provide for a transmitting device to concatenate one or more sets of service data units (SDUs) at a PDCP layer and perform PDCP processing on the concatenated SDUs (e.g., instead of processing each individual SDU). For example, the transmitting device may identify multiple SDUs at the PDCP layer (which may be output from another layer of the protocol stack) and may input the SDUs into one or more concatenation buffers of the transmitting device. In some cases, when using multiple concatenation buffers, each of the concatenation buffers may be associated with a respective configuration for concatenating SDUs (e.g., a respective configuration of a threshold size and/or a timer). For example, a concatenation buffer may be configured to concatenate SDUs until reaching a threshold size, until a concatenation timer expires, or both. In the example of multiple concatenation buffers, respective concatenation buffers may each be configured with different threshold sizes, different concatenation timers, or both (e.g., parameters respectively configured per concatenation buffer). Additionally, or alternatively, the multiple concatenation buffers may be configured to concatenate SDUs according to a radio link control (RLC) entity, a quality of service (QoS) flow, or both associated with the SDUs (e.g., the transmitting device may route SDUs to concatenation buffers according to RLC entity and QoS flow).

A method for wireless communications by a first wireless device is described. The method may include identifying a set of multiple SDUs at a PDCP layer of the first wireless device, each SDU associated with data for transmission to a second wireless device, concatenating the set of multiple SDUs to obtain two or more concatenated SDUs, where respective sets of SDUs are concatenated using respective concatenation buffers of a set of multiple concatenation buffers based on a configuration of each respective concatenation buffer, and transmitting, to the second wireless device, one or more messages including the two or more concatenated SDUs.

A first wireless device for wireless communications is described. The first wireless device may include one or more memories storing processor-executable code, and one or more processors coupled with the one or more memories. The one or more processors may individually or collectively operable to execute the code to cause the first wireless device to identify a set of multiple SDUs at a PDCP layer of the first wireless device, each SDU associated with data for transmission to a second wireless device, concatenate the set of multiple SDUs to obtain two or more concatenated SDUs, where respective sets of SDUs are concatenated using respective concatenation buffers of a set of multiple concatenation buffers based on a configuration of each respective concatenation buffer, and transmit, to the second wireless device, one or more messages including the two or more concatenated SDUs.

Another first wireless device for wireless communications is described. The first wireless device may include means for identifying a set of multiple SDUs at a PDCP layer of the first wireless device, each SDU associated with data for transmission to a second wireless device, means for concatenating the set of multiple SDUs to obtain two or more concatenated SDUs, where respective sets of SDUs are concatenated using respective concatenation buffers of a set of multiple concatenation buffers based on a configuration of each respective concatenation buffer, and means for transmitting, to the second wireless device, one or more messages including the two or more concatenated SDUs.

A non-transitory computer-readable medium storing code for wireless communications is described. The code may include instructions executable by one or more processors to identify a set of multiple SDUs at a PDCP layer of the first wireless device, each SDU associated with data for transmission to a second wireless device, concatenate the set of multiple SDUs to obtain two or more concatenated SDUs, where respective sets of SDUs are concatenated using respective concatenation buffers of a set of multiple concatenation buffers based on a configuration of each respective concatenation buffer, and transmit, to the second wireless device, one or more messages including the two or more concatenated SDUs.

In some examples of the method, first wireless devices, and non-transitory computer-readable medium described herein, concatenating the set of multiple SDUs may include operations, features, means, or instructions for concatenating, via a first concatenation buffer, a first subset of SDUs of the set of multiple SDUs to obtain a first concatenated SDU and concatenating, via a second concatenation buffer, a second subset of SDUs of the set of multiple SDUs to obtain a second concatenated SDU.

In some examples of the method, first wireless devices, and non-transitory computer-readable medium described herein, the first concatenation buffer may be associated with first configuration of a concatenation timer, a threshold SDU size, or both, where the first subset of SDUs may be concatenated in accordance with the first configuration; and the second concatenation buffer may be associated with a second configuration of the concatenation timer, the threshold SDU size, or both, the second configuration different from the first configuration, where the second subset of SDUs may be concatenated in accordance with the second configuration.

In some examples of the method, first wireless devices, and non-transitory computer-readable medium described herein, the first subset of SDUs may be concatenated via the first concatenation buffer based on both the first subset of SDUs and the first concatenation buffer associated with a first QoS flow, a first RLC entity, or both; and the second subset of SDUs may be concatenated via the second concatenation buffer based on the second subset of SDUs and the second concatenation buffer being associated with a second QoS flow different from the first QoS flow, a second RLC entity different from the first RLC entity, or both.

Some examples of the method, first wireless devices, and non-transitory computer-readable medium described herein may further include operations, features, means, or instructions for applying a first PDCP header to the first concatenated SDU after performing ciphering and integrity protection for the first concatenated SDU, the first PDCP header including a first sequence number (SN) associated with the first concatenated SDU and applying a second PDCP header to the second concatenated SDU after performing ciphering and integrity protection for the second concatenated SDU, the second PDCP header including a second SN associated with the first concatenated SDU.

In some examples of the method, first wireless devices, and non-transitory computer-readable medium described herein, a value of the first SN associated with the first concatenated SDU may be less than a value of the second SN associated with the second concatenated SDU from the second concatenation buffer.

Some examples of the method, first wireless devices, and non-transitory computer-readable medium described herein may further include operations, features, means, or instructions for applying, prior to concatenating the set of multiple SDUs, a respective SN to each SDU of the set of multiple SDUs, where each concatenated SDU of the two or more concatenated SDUs includes a set of respective SNs corresponding to a set of SDUs included in a respective concatenated SDU.

Some examples of the method, first wireless devices, and non-transitory computer-readable medium described herein may further include operations, features, means, or instructions for appending a respective set of multiple length subheaders for each concatenated SDU, each length subheader indicating a size of a corresponding SDU included in a respective concatenated SDU.

In some examples of the method, first wireless devices, and non-transitory computer-readable medium described herein, each set of multiple length subheaders may be included in a header of a corresponding concatenated SDU.

In some examples of the method, first wireless devices, and non-transitory computer-readable medium described herein, each length subheader of the respective set of multiple length subheaders may be located before the corresponding SDU included in the respective concatenated SDU.

Some examples of the method, first wireless devices, and non-transitory computer-readable medium described herein may further include operations, features, means, or instructions for receiving, when establishing a radio bearer with the second wireless device, a control message indicating the configuration of each respective concatenation buffer, where concatenating the set of multiple SDUs may be based on receiving the control message.

Some examples of the method, first wireless devices, and non-transitory computer-readable medium described herein may further include operations, features, means, or instructions for receiving one or more control messages indicating the configuration of each respective concatenation buffer, where concatenating the set of multiple SDUs may be based on receiving the one or more control messages.

In some examples of the method, first wireless devices, and non-transitory computer-readable medium described herein, the configuration of each respective concatenation buffer may be based on a mapping between one or more concatenation parameters and a channel quality index value.

A method for wireless communications by a first wireless device is described. The method may include receiving, from a second wireless device, one or more messages including two or more concatenated SDUs, where each concatenated SDU of the two or more concatenated SDUs include a respective set of SDUs associated with data for the first wireless device and decoding the data for the first wireless device in accordance with an order of the respective set of SDUs included in each concatenated SDU and based on one or more SNs included in each concatenated SDU.

A first wireless device for wireless communications is described. The first wireless device may include one or more memories storing processor executable code, and one or more processors coupled with the one or more memories. The one or more processors may individually or collectively operable to execute the code to cause the first wireless device to receive, from a second wireless device, one or more messages including two or more concatenated SDUs, where each concatenated SDU of the two or more concatenated SDUs include a respective set of SDUs associated with data for the first wireless device and decode the data for the first wireless device in accordance with an order of the respective set of SDUs included in each concatenated SDU and based on one or more SNs included in each concatenated SDU.

Another first wireless device for wireless communications is described. The first wireless device may include means for receiving, from a second wireless device, one or more messages including two or more concatenated SDUs, where each concatenated SDU of the two or more concatenated SDUs include a respective set of SDUs associated with data for the first wireless device and means for decoding the data for the first wireless device in accordance with an order of the respective set of SDUs included in each concatenated SDU and based on one or more SNs included in each concatenated SDU.

A non-transitory computer-readable medium storing code for wireless communications is described. The code may include instructions executable by one or more processors to receive, from a second wireless device, one or more messages including two or more concatenated SDUs, where each concatenated SDU of the two or more concatenated SDUs include a respective set of SDUs associated with data for the first wireless device and decode the data for the first wireless device in accordance with an order of the respective set of SDUs included in each concatenated SDU and based on one or more SNs included in each concatenated SDU.

In some examples of the method, first wireless devices, and non-transitory computer-readable medium described herein, receiving the one or more messages may include operations, features, means, or instructions for receiving a first concatenated SDU and a second concatenated SDU, the first concatenated SDU including a first SN and the second concatenated SDU including a second SN different from the first SN, the method further including and determining an order of the first concatenated SDU and the second concatenated SDU based on the first SN and the second SN, where the order of the respective set of SDUs may be based on the order of the first concatenated SDU and the second concatenated SDU.

In some examples of the method, first wireless devices, and non-transitory computer-readable medium described herein, the order of the first concatenated SDU and the second concatenated SDU may be based on the first concatenated SDU being associated with a first QoS flow and the second concatenated SDU being associated with a second QoS flow different from the first QoS flow.

Some examples of the method, first wireless devices, and non-transitory computer-readable medium described herein may further include operations, features, means, or instructions for identifying, within each concatenated SDU, a respective SN for each SDU of the respective set of SDUs, where the order of the respective set of SDUs may be based on the respective SNs.

Some examples of the method, first wireless devices, and non-transitory computer-readable medium described herein may further include operations, features, means, or instructions for identifying a respective set of multiple length subheaders for each concatenated SDU of the two or more concatenated SDUs, each length subheader indicating a size of a corresponding SDU included in a respective concatenated SDU, where decoding the data may be based on the respective set of multiple length subheaders.

In some examples of the method, first wireless devices, and non-transitory computer-readable medium described herein, each set of multiple length subheaders may be included in a header of a corresponding concatenated SDU.

In some examples of the method, first wireless devices, and non-transitory computer-readable medium described herein, each length subheader of the respective set of multiple length subheaders may be located before the corresponding SDU included in the respective concatenated SDU.

DETAILED DESCRIPTION

Figure 1:
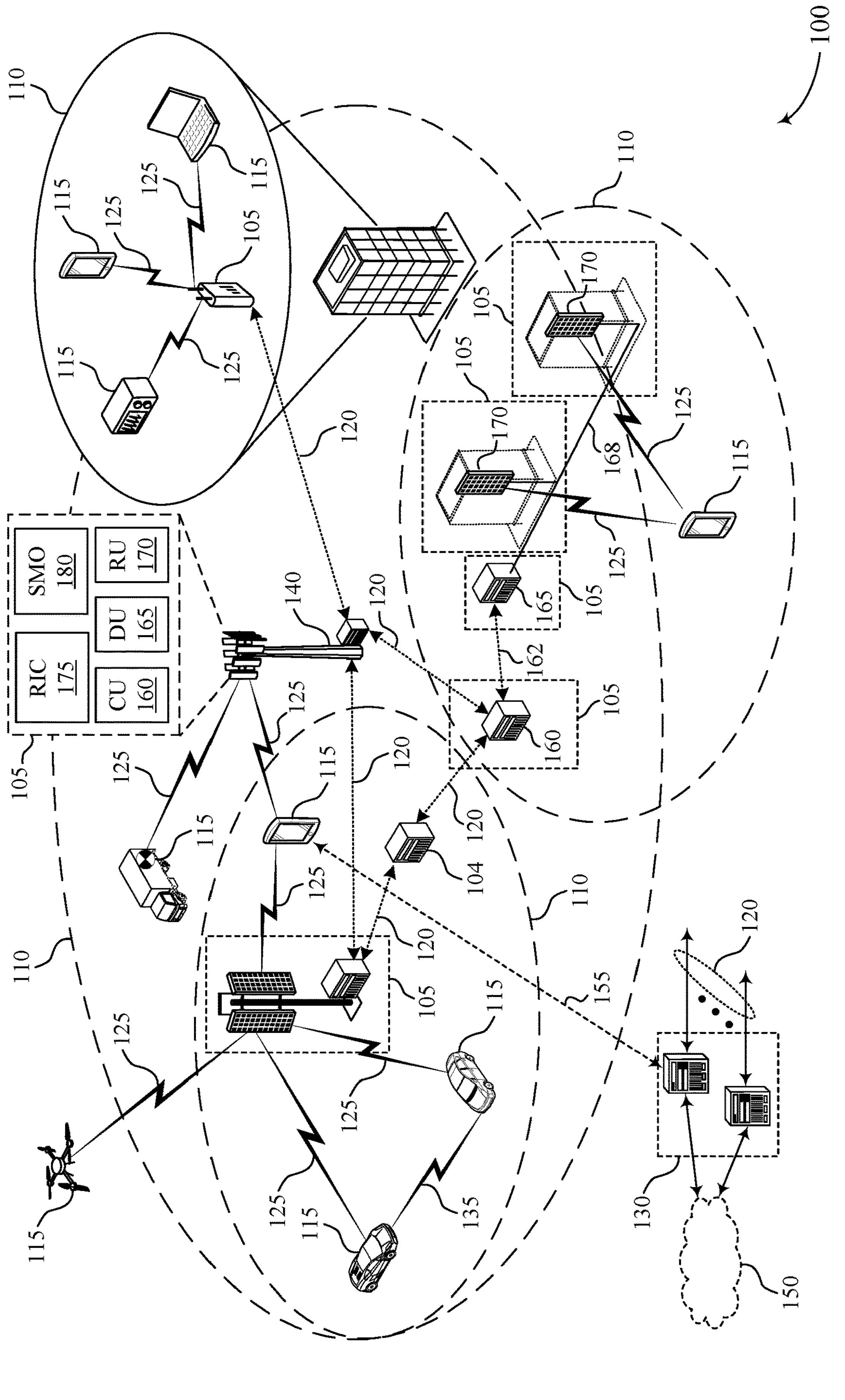
FIG. 1 shows an example of a wireless communications system that supports multiple concatenation buffers at a packet layer convergence protocol (PDCP) layer in accordance with one or more aspects of the present disclosure.

In some wireless communications systems, a transmitting wireless device (e.g., a user equipment (UE) or a network entity) may process data for transmission according to one or more layers of a protocol stack (e.g., a control plane protocol stack or a user plane protocol stack). In some examples, such layers may include a packet layer convergence protocol (PDCP) layer that supports transferring data by performing ciphering an integrity protection on the data before applying a PDCP header to the data. Inputs of the PDCP layer (e.g., from another protocol layer) may be referred to as service data units (SDUs) (e.g., PDCP SDUs), and the transmitting device may perform PDCP layer processing on each SDU that is input into the PDCP layer, such as integrity protection and ciphering. In some cases, concatenating SDUs may result in improved processing performance for a transmitting device. For example, SDU concatenation may be associated with reduced processing complexity (e.g., relatively reduced layer 2 (L2) processing complexity) and reduced communication overhead (e.g., by reducing a quantity of appended headers when forming a protocol data unit (PDU) output to another layer).

To support SDU concatenation, a transmitting device may concatenate one or more sets of SDUs and may perform PDCP processing on the concatenated SDUs. For example, the transmitting device may identify multiple SDUs at the PDCP layer (which may be output from a previous layer) and may input the SDUs into one or more concatenation buffers of the transmitting device. In some cases, when using multiple concatenation buffers, each of the concatenation buffers may be associated with a respective configuration for concatenating SDUs. For example, a concatenation buffer may be configured to concatenate SDUs until reaching a threshold size, until a concatenation timer expires, or both. Further, respective concatenation buffers may each be configured with different threshold sizes, different concatenation timers, or both (e.g., parameters respectively configured per concatenation buffer). Additionally, or alternatively, the multiple concatenation buffers may be configured to concatenate SDUs according to a radio link control (RLC) entity, a quality of service (QoS) flow, or both associated with the SDUs (e.g., the transmitting device may route SDUs to concatenation buffers according to RLC entity and QoS flow). By implementing multiple concatenation buffers at the PDCP layer, latency associated with SDU processing and header application may be reduced, thereby improving a throughput of the transmitting device.

Aspects of the disclosure are initially described in the context of wireless communications systems. Aspects of the disclosure are further illustrated by and described with reference to a PDCP configuration, sequence numbering schemes, length subheader configurations, an SDU concatenation scheme, and a process flow. Aspects of the disclosure are further illustrated by and described with reference to apparatus diagrams, system diagrams, and flowcharts that relate to multiple concatenation buffers at a PDCP layer.

FIG. 1 shows an example of a wireless communications system 100 that supports multiple concatenation buffers at a PDCP layer in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), PDCP). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multiple concatenation buffers at a PDCP layer as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, a transmitting wireless device (e.g., a network entity 105 or a UE 115) may process data for transmission according to one or more layers of a protocol stack as described herein. For example, the transmitting wireless device may support L2 functionality and signaling, which may include PDCP (or SDAP) functions. The transmitting wireless device may identify SDUs at the PDCP layer (e.g., protocol data units (PDUs) received from a previous layer, such as an RRC layer) and may perform one or more PDCP functions on the SDUs. For example, the transmitting wireless device may perform integrity protection on PDCP SDUs, such as by a user plane integrity protection (UPIP) function, which may support the transmitting wireless device communicating at a desired data rate (e.g., UPIP may be mandatory for the transmitting wireless device to maintain a full data rate). However, a throughput of the transmitting wireless device may be associated with (e.g., limited by) a quantity of the SDUs due to performing PDCP layer functions on each SDU individually. For example, some functions (e.g., cryptographic processing) may include initialization and security key setup procedures, and the transmitting wireless device may communicate with hardware accelerators at a relatively high rate (e.g., increasing a load on hardware even if the hardware is capable of supporting larger SDU sizes).

To reduce latency associated with individually processing PDCP SDUs, a transmitting device may concatenate one or more sets of SDUs and may perform PDCP processing on the concatenated SDUs. For example, the transmitting device may input a set of multiple SDUs into a concatenation buffer at the PDCP layer, which may concatenate the multiple SDUs into a single concatenated SDU (e.g., a pseudo SDU including each SDU input into the concatenation buffer). A "concatenated SDU," as used herein, may refer to a set of multiple SDUs that are concatenated together. In some cases, when using multiple concatenation buffers, each of the concatenation buffers may be associated with a respective configuration for concatenating SDUs. For example, the multiple concatenation buffers may be configured to concatenate SDUs until reaching a threshold size, a concatenation timer expiring, or both (e.g., parameters which may be respectively configured per concatenation buffer). Additionally, or alternatively, the multiple concatenation buffers may be configured to concatenate SDUs according to a RLC entity, a QoS flow, or both associated with the SDUs (e.g., the transmitting device may route SDUs to concatenation buffers according to RLC entity and QoS flow). By implementing multiple concatenation buffers at the PDCP layer, latency, processing time, and overhead associated with PDCP processing may be reduced, thereby improving a throughput of the transmitting device.

Figure 2:
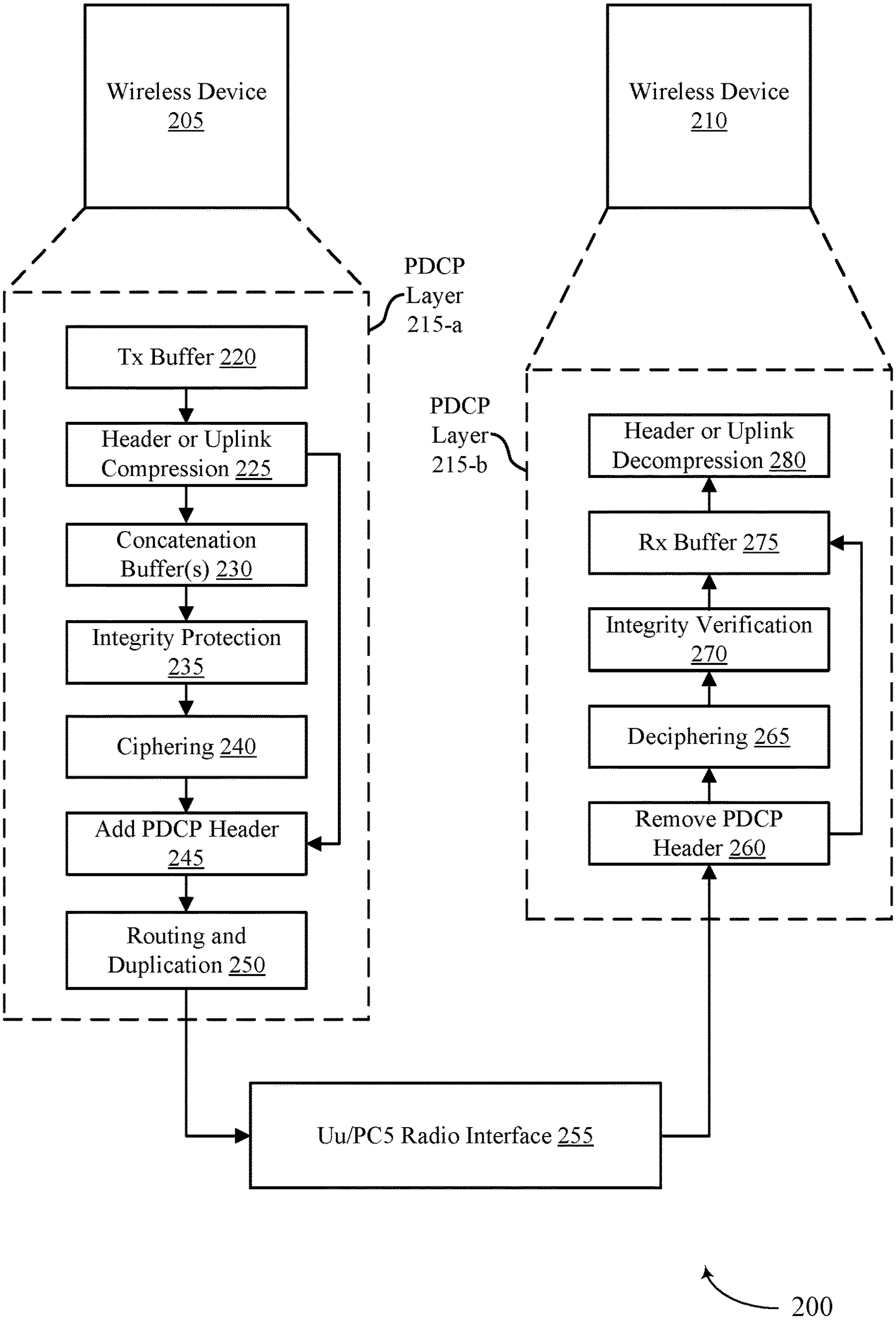
FIG. 2 shows an example of a wireless communications system that supports multiple concatenation buffers at a PDCP layer in accordance with one or more aspects of the present disclosure.

FIG. 2 shows an example of a wireless communications system 200 that supports multiple concatenation buffers at a PDCP layer in accordance with one or more aspects of the present disclosure. The wireless communications system 200 may implement, or be implemented by, one or more aspects of the wireless communications system 100. For example, the wireless communications system 200 supports communications between a wireless device 205 (e.g., a transmitting wireless device) and a wireless device 210 (e.g., a receiving wireless device), each of which may be an example of a network entity 105, a UE 115, or any other suitable network node described with reference to FIG. 1. In some cases, the wireless device 205 and the wireless device 210 may perform signaling and data processing according to a protocol stack, which may include a PDCP layer. For example, the wireless device 205 may process data for transmission using functions of a PDCP layer 215-*a* and the wireless device 210 may process received data using functions of a PDCP layer 215-*b*.

In some cases, the wireless device 205 may identify one or more SDUs at the PDCP layer 215-*a*, which may include data for transmission to the wireless device 210. For example, the wireless device 205 may receive the SDUs from a previous layer of the protocol stack (e.g., an RRC layer, an SDAP layer, or the like), which may be initially stored in a transmission buffer 220. In some cases, the wireless device 205 may perform sequence numbering to provide an ordering to the SDUs in the transmission buffer 220. For example, the wireless device 205 may apply a first sequence number (SN) (e.g., SN 1) to a first SDU in the transmission buffer 220, may apply a second SN (e.g., SN 2) to a second SDU in the transmission buffer 220, and so on. After storing the one or more SDUs in the transmission buffer 220, the wireless device 205 may apply header or uplink compression 225 to the SDUs. The wireless device 205 perform header compression or uplink data compression to the SDUs, which may reduce a size of the SDUs (e.g., to conserve radio resources). For example, if a size of a header of an SDU is relatively large compared to a data portion of the SDU, the wireless device 205 may apply header compression to the SDU (e.g., robust header compression (ROHC)). Additionally, or alternatively, if the SDUs are associated with uplink data, the wireless device 205 may apply an uplink data compression function (which may be preconfigured for a data radio bearer (DRB)) to the SDUs.

In some examples, the wireless device 205 may route the SDUs into one or more concatenation buffers 230, which may concatenate multiple SDUs into a single concatenated SDU. For example, the wireless device 205 may input SDUs into a concatenation buffer 230 until satisfying one or more parameters, such as a concatenation timer expiring, a threshold concatenated SDU size being reached, or both. In some cases, the wireless device 205 may perform concatenation using multiple concatenation buffers 230, as described with reference to FIGS. 3 through 6. For example, each concatenation buffer 230 may be configured with a respective set of one or more concatenation parameters (e.g., respective values for concatenationTimer and maxSDUSize, among other parameters), may be associated with a respective RLC entity or QoS flow, or any combination thereof. The wireless device 205 may route each SDU to a concatenation buffer 230 according to the configuration of the concatenation buffer 230 and data associated with each respective SDU to obtain one or more concatenated SDUs (e.g., outputting one or more concatenated SDUs per concatenation buffer 230). That is, each concatenation buffer of a set of multiple concatenation buffers may be configured to concatenate SDUs associated with a respective traffic type corresponding to a QoS flow or RLC entity, or both, which may enable efficient communication for each traffic type.

In some cases, the wireless device 205 may perform one or more PDCP layer 215-*a* functions on the one or more concatenated SDUs. For example, the wireless device 205 may perform integrity protection 235 on the one or more concatenated SDUs to verify the concatenated SDUs, and may apply a message authentication code integrity (MAC-I) field to each concatenated SDU verified via the integrity protection 235. Additionally, the wireless device 205 may performing ciphering 240 on the one or more concatenated SDUs to prepare the concatenated SDUs for transmission to the wireless device 210 (e.g., encoding data associated with the concatenated SDUs). In some cases, performing the PDCP layer 215-*a* functions (e.g., integrity protection 235 and ciphering 240) on the concatenated SDUs instead of on each individual SDU may reduce a quantity and frequency of hardware invocations at the wireless device 205, overhead associated with the PDCP layer 215-*a* (e.g., UPIP overhead), latency associated with processing data (e.g., cryptographic processing time), or any combination thereof, among other benefits.

In some examples, after performing the PDCP layer 215-*a* functions on the one or more concatenated SDUs, the wireless device 205 may add PDCP headers 245 to the one or more concatenated SDUs. Alternatively, the wireless device 205 may add the PDCP headers 245 to one or more SDUs following the header or uplink compression 225 (e.g., without routing the SDUs through the concatenation buffers 230, the integrity protection 235, and the ciphering 240). In some cases, adding a PDCP header 245 to an SDU may convert the SDU into a PDCP PDU. For example, the one or more concatenated SDUs may become one or more concatenated PDUs after adding the PDCP headers 245. In some examples, the wireless device 205 may performing routing and duplication 250 on the one or more concatenated PDUs based on adding the PDCP headers 245. The routing and duplication 250 may support the wireless device 205 routing PDCP PDUs to an intended radio bearer and duplicating PDCP PDUs for transmission to different radio bearers (e.g., if a split bearer configuration is enabled).

In some cases, the wireless device 205 may transmit one or more messages including the one or more concatenated PDUs to the wireless device 210 via a Uu or PC5 radio interface 255. In some cases, the wireless device 205 may perform additional processing on the concatenated PDUs according to one or more subsequent layers of the protocol stack, such as an RLC layer and a MAC layer, before transmitting the one or more messages via a PHY layer (e.g., the Uu or PC5 radio interface 255).

The wireless device 210 may receive, from the wireless device 205 via the Uu or PC5 radio interface 255, the one or more messages including the one or more concatenated PDUs. In some cases, the wireless device 210 may process and decode the one or more concatenated PDUs according to functions of the PDCP layer 215-*b*. For example, the wireless device 210 may remove PDCP headers 260 from the one or more concatenated PDUs to obtain one or more concatenated SDUs (e.g., the concatenated SDUs output from the concatenation buffers 230). The wireless device 210 may decode the one or more concatenated SDUs by performing deciphering 265 (e.g., an inverse of the ciphering 240) and may verify the one or more concatenated SDUs by performing integrity verification 270 (e.g., confirming the MAC-I field output from the integrity protection 235). In some examples, the wireless device 210 may input the decoded concatenated SDUs into a reception buffer 275, where the wireless device 210 may separate the concatenated SDUs into individual SDUs, reorder the SDUs (e.g., according to SNs included in the concatenated SDUs), and discard any duplicate SDUs. The wireless device 210 may then perform header or uplink decompression 280 on the SDUs to obtain the SDUs initially generated by the wireless device 205.

Figure 3:
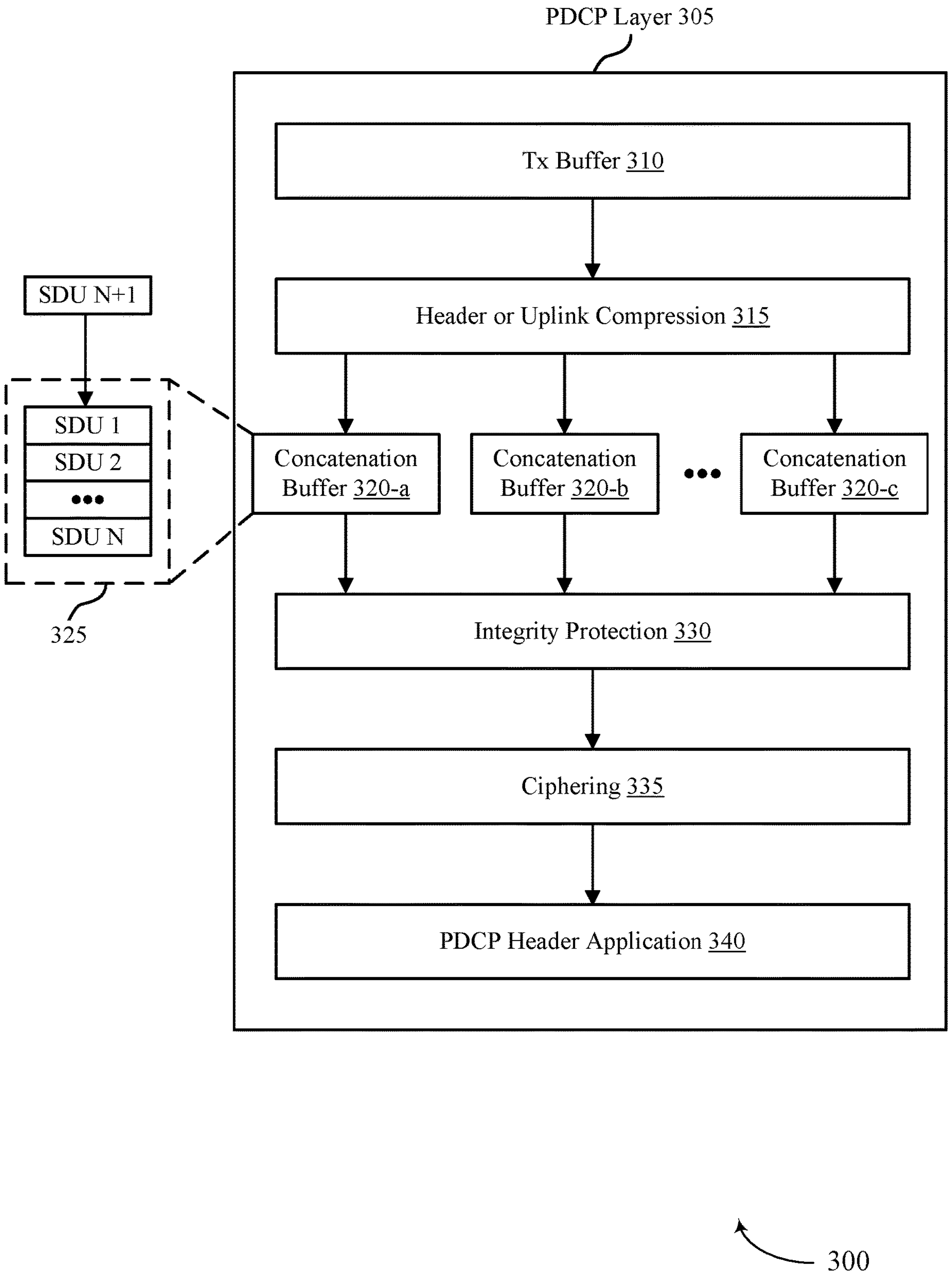
FIG. 3 shows an example of a PDCP configuration that supports multiple concatenation buffers at a PDCP layer in accordance with one or more aspects of the present disclosure.

FIG. 3 shows an example of a PDCP configuration 300 that supports multiple concatenation buffers at a PDCP layer in accordance with one or more aspects of the present disclosure. The PDCP configuration 300 may implement, or be implemented by, one or more aspects of the wireless communications systems 100 and 200. For example, the PDCP configuration 300 shows functionality associated with a PDCP layer 305 at a transmitting wireless device, which may be an example of the PDCP layer 215-*a* at the wireless device 205 described with reference to FIG. 2. In some cases, the PDCP configuration 300 may support the transmitting wireless device concatenating PDCP SDUs using multiple concatenation buffers.

The transmitting wireless device may identify one or more SDUs at the PDCP layer 305 and may store the one or more SDUs in a transmission buffer 310. In some examples, the transmitting wireless device may apply respective SNs to the one or more SDUs in the transmission buffer 310 (e.g., sequence numbering occurs prior to concatenation, as described further with reference to FIG. 4B). Additionally, the transmitting wireless device may perform header or uplink compression 315 on the one or more SDUs (e.g., to reduce a size of the headers of the SDUs or uplink data of the SDUs), which may be an example of the header or uplink compression 225 described with reference to FIG. 2.

In some examples, the transmitting wireless device may concatenate the SDUs using multiple concatenation buffers 320, such as a concatenation buffer 320-*a*, a concatenation buffer 320-*b*, and a concatenation buffer 320-*c*. In some cases, using multiple concatenation buffers 320 may support the transmitting wireless device concatenating SDUs according to one or more network parameters or channel conditions. For example, different frequency ranges, such as frequency range 1 (FR1) and FR2, and different communication schemes, such as carrier aggregation and/or dual connectivity, may support different types of SDU concatenation using different concatenation buffers 320. As an example, while communicating via FR1 frequencies, the transmitting wireless device may use a concatenation buffer 320 that supports a relatively small concatenated SDU size (e.g., due to FR1 communications being limited by (re) segmentation and reordering overhead). As another example, while communicating via FR2 frequencies, the transmitting wireless device may use a concatenation buffer 320 that supports a relatively large concatenated SDU size (e.g., due to FR2 frequencies supporting large SDU or PDU sizes). Additionally, the transmitting wireless device may determine which concatenation buffers 320 to use according to respective QoS flows (e.g., QoS flows shared in a DRB) associated with the concatenation buffers 320.

For example, the transmitting wireless device may use the concatenation buffer 320-*a* to obtain a first concatenated SDU 325, which may include a concatenation of multiple SDUs (e.g., SDU 1 through SDU N, where N may be any integer value). The transmitting wireless device may similarly use the concatenation buffer 320-*b* and the concatenation buffer 320-*c* to obtain a second concatenated SDU 325 and a third concatenated SDU 325, respectively. It should be noted that the transmitting wireless device may support any quantity of concatenation buffers 320 and is not limited to the quantity illustrated by the PDCP configuration 300.

In some cases, the concatenation buffers 320 may operate according to respective configurations. For example, the concatenation buffers 320 may be configured with respective sets of concatenation parameters to determine when the content of a corresponding concatenation buffer 320 should be forwarded (e.g., as a single concatenated SDU 325). A set of concatenation parameters configured for a concatenation buffer 320 may indicate a duration for concatenating SDUs using the concatenation buffer 320 (e.g., concatenation-Timer), a threshold size associated with the concatenation buffer 320 (e.g., maxSDUSize), or both. In some examples, the duration for concatenating SDUs may be set according to a threshold allowable delay for a radio bearer, a QoS flow of a corresponding concatenation buffer 320, an implementation choice by a wireless device, or any combination thereof. In some examples, the threshold size may be based on an implementation choice by a wireless device, a capability of the transmitting wireless device (e.g., indicated by the transmitting wireless device to a network), one or more network considerations (e.g., a lower bound typical grant size, a channel occupancy time (COT) configured for the network, or the like), or any combination thereof.

As an example, the concatenation buffer 320-*a* may be configured with a first duration value for concatenating SDUs and a first threshold size associated with the first concatenated SDU 325. In such an example, the transmitting wireless device may initiate a concatenation timer after inputting a first SDU (e.g., SDU 1) into the concatenation buffer 320-*a* and may input one or more subsequent SDUs (e.g., SDU 2 through SDU N) into the concatenation buffer 320-*a* until the concatenation timer elapses (e.g., a duration of the timer exceeds the first duration value).

Otherwise, if the concatenation timer has not elapsed, the transmitting wireless device may maintain a size of the first concatenated SDU 325 (e.g., Concatenated_SDU_Size) in the concatenation buffer 320-*a*, and may compare the size to the first threshold size after adding each SDU to the concatenated SDU 325. For example, when a new SDU arrives to the concatenation buffer 320-*a* (e.g., SDU N+1), the transmitting wireless device may determine whether the size of the concatenated SDU 325 including the new SDU exceeds the first threshold size (e.g., whether new SDU size+Concatenated_SDU_Size>maxSDUSize).

In a first example, if the concatenated SDU 325 including the new SDU does exceed the first threshold size, the transmitting wireless device may forward the content of the concatenation buffer 320-*a* (e.g., without the SDU N+1) as a single concatenated SDU 325, may flush the concatenation buffer 320-*a* (e.g., empty the concatenation buffer 320-*a*), and the transmitting wireless device may input the new SDU into the concatenation buffer 320-*a* (e.g., setting Concatenated_SDU_Size=new SDU size). In such examples, the transmitting wireless device may stop and restart the concatenation timer for the concatenation buffer 320-*a* based on forwarding the content of the concatenation buffer 320-*a*. In a second example, if the concatenated SDU 325 including the new SDU does not exceed the first threshold size, the transmitting wireless device may add the new SDU to the concatenation buffer 320-*a* and may update the size of the concatenated SDU 325 (e.g., Concatenated_SDU_Size=Concatenated_SDU_Size+new SDU size).

The transmitting wireless device may perform similar techniques for managing other concatenation buffers 320, such as the concatenation buffer 320-*b* and the concatenation buffer 320-*c*, according to respective concatenation parameters (e.g., a respective concatenation timer and threshold size) configured for each other concatenation buffer 320. Additionally, or alternatively, the configurations for the concatenation buffers 320 may indicate a respective RLC entity, a respective QoS flow, or both associated with each concatenation buffer 320, as described further with reference to FIG. 6.

In some cases, the transmitting wireless device may identify the configuration for each respective the concatenation buffers 320 during a bearer establishment procedure. For example, when establishing a radio bearer with a receiving wireless device, the transmitting wireless device may receive a control message indicating the configuration (e.g., a concatenation timer, a threshold size, an RLC entity, a QoS flow, or any combination thereof) of each respective concatenation buffer 320. In such examples, the configuration of each respective concatenation buffer 320 may remain static until the radio bearer is released (e.g., configurations may not be changed until the bearer is released).

In some examples, the transmitting wireless device may dynamically adjust the configuration of each respective concatenation buffer 320. In a first example, the transmitting wireless device may receive one or more control messages (e.g., via RRC or MAC-CE signaling) informing the transmitting wireless device of the configuration of each respective concatenation buffer 320. In a second example, the transmitting wireless device may be configured (e.g., preconfigured) with a mapping relating configurations with a channel quality index (CQI). In such examples, the transmitting wireless device may determine concatenation parameters for a concatenation buffer 320 according to an identified CQI (e.g., via a measurement) and the mapping. Table 1 below shows an example of such a mapping:

TABLE 1

| CQI Index | Concatenation Parameters |
|---|---|
| 1 | {concatenationTimer1, maxSDUSize1}: value (0, 0) for no concatenation |
| 2 | {concatenationTimer2, maxSDUSize2} |
| . . . | . . . |
| 15 | {concatenationTimer15, maxSDUSize15} |

As shown in Table 1, the transmitting wireless device may dynamically adjust concatenation parameters for a concatenation buffer 320 based on a set of CQIs. In some cases, each respective concatenation buffer 320 may be associated with a respective mapping between CQI and concatenation parameters. Alternatively, the mapping between CQI and concatenation parameters may be configured per PDCP entity. Such dynamic adjustments may improve adaptability of the concatenation buffer 320 configurations with respect to channel conditions, which may support the transmitting wireless device using a higher-order active queue management (AQM) and a larger MAC PDU size (e.g., to improve use of COT by the transmitting wireless device) when communicating with relatively strong channel conditions.

In some cases, after forwarding one or more concatenated SDUs 325 from the concatenation buffers 320, the transmitting wireless device may perform one or more PDCP layer 305 functions on the one or more concatenated SDUs 325. For example, the transmitting wireless device may perform integrity protection 330, ciphering 335, and PDCP header application 340 on each of the one or more concatenated SDUs 325 in accordance with techniques described with reference to FIG. 2. In some examples, as part of the PDCP header application 340, the transmitting wireless device may apply a respective SN to each of the one or more concatenated SDUs 325 (e.g., sequence numbering occurs prior to concatenation, as described further with reference to FIG. 4A). By performing PDCP layer 305 functions on concatenated SDUs 325 instead of individual SDUs and utilizing multiple concatenation buffers 320 with respective configurations, latency, processing time, and overhead associated with PDCP layer 305 processing may be reduced, thereby improving a throughput and reducing a L2 processing complexity of the transmitting wireless device.

Figure 4A:
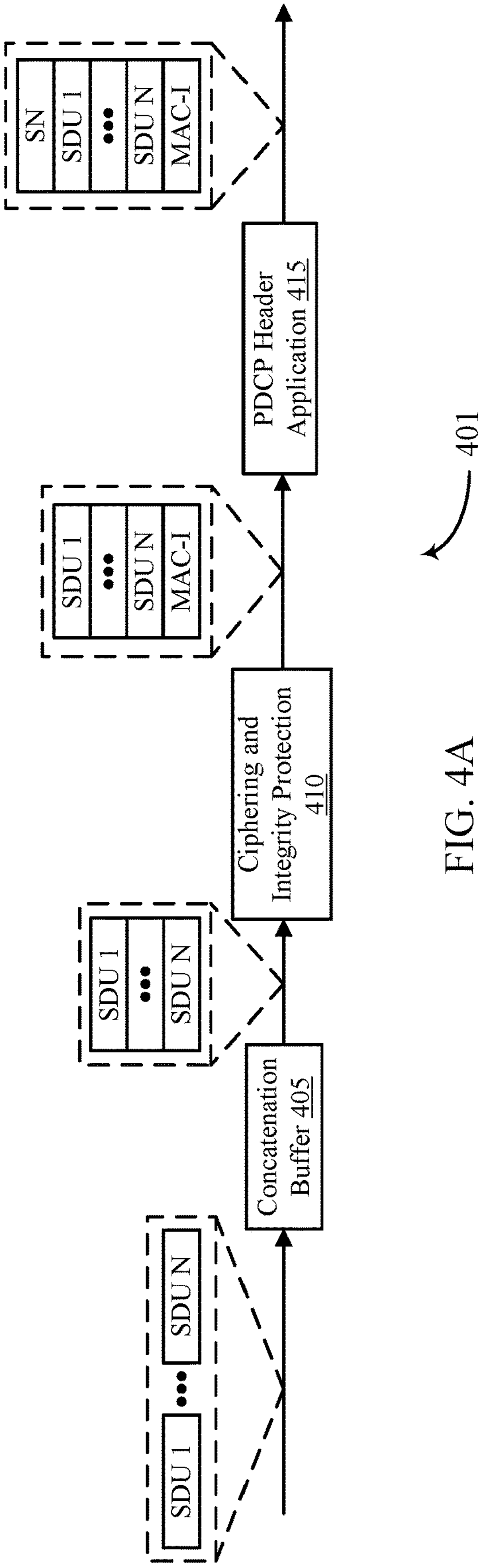
FIGS. 4A and 4B show examples of sequence numbering schemes that support multiple concatenation buffers at a PDCP layer in accordance with one or more aspects of the present disclosure.
Figure 4B:
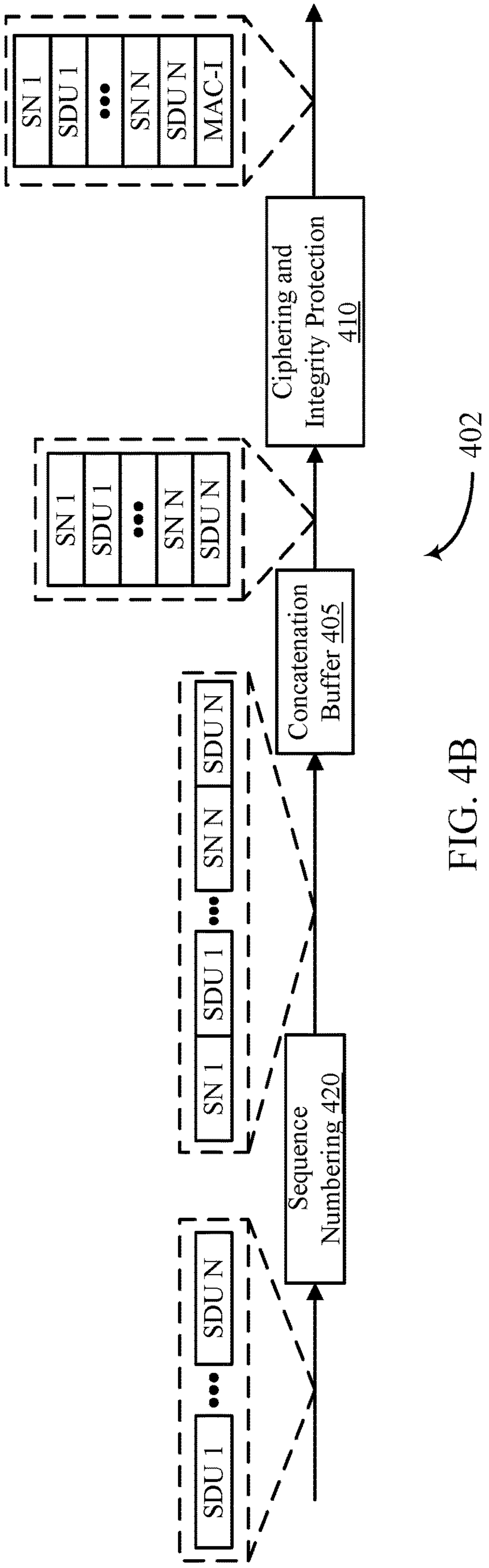

FIGS. 4A and 4B show examples of a sequence numbering scheme 401 and a sequence numbering scheme 402, respectively, that support multiple concatenation buffers at a PDCP layer in accordance with one or more aspects of the present disclosure. The sequence numbering schemes 401 and 402 may implement, or be implemented by, one or more aspects of the wireless communications systems 100 and 200, as well as the PDCP configuration 300. For example, the sequence numbering schemes 401 and 402 may support a transmitting wireless device concatenating SDUs at a PDCP layer using one or more concatenation buffers 405, which may be examples of corresponding devices and techniques described with reference to FIGS. 1 through 3.

The sequence numbering scheme 401 shows an example of a transmitting wireless device applying sequence numbers (SNs) to SDUs after concatenating the SDUs using a concatenation buffer 405. For example, a transmission buffer of the transmitting wireless device may include a set of SDUs (e.g., SDU 1 through SDU N), and the transmitting wireless device may input the set of SDUs into the concatenation buffer 405 to obtain a concatenated SDU (e.g., a single concatenated SDU including each of the SDU 1 through the SDU N). In some examples, the transmitting wireless device may perform one or more PDCP layer functions on the concatenated SDU, such as ciphering and integrity protection 410, which may result in the transmitting wireless device applying a MAC-I field to the concatenated SDU. In some examples, the transmitting wireless device may perform PDCP header application 415 on the concatenated SDU, and may apply a SN to the concatenated SDU as part of the PDCP header application 415.

Further, if the transmitting wireless device uses multiple concatenation buffers 405, the transmitting wireless device may apply sequential SNs to one or more subsequent concatenated SDUs. For example, the transmitting wireless device may apply a first PDCP header to a first concatenated SDU output from a first concatenation buffer 405, where the first PDCP header includes a first SN, and may apply a second PDCP header to a second concatenated SDU output from a second concatenation buffer 405, where the second PDCP header includes a second SN. In some cases, the first SN associated with the first concatenated SDU may have a value that is less than the second SN associated with the second concatenated SDU (e.g., the first SN may be one less than the second SN).

In some examples, ordering the concatenated SDUs according to the sequence numbering scheme 401 may reduce an overhead associated with communicating the concatenated SDUs (e.g., due to including one SN per concatenated SDU) and may reduce a complexity associated with ciphering (or deciphering) the concatenated SDUs (e.g., since the SNs are sequenced per-concatenated SDU).

The sequence numbering scheme 402 shows an example of a transmitting wireless device applying SNs to SDUs prior to concatenating the SDUs using a concatenation buffer 405. For example, a transmission buffer of the transmitting wireless device may include a set of SDUs (e.g., SDU 1 through SDU N), and the transmitting wireless device may perform sequence numbering 420 on each SDU included in the transmission buffer. In some cases, performing the sequence numbering 420 may include the transmitting wireless device applying a respective SN to each SDU in the transmission buffer (e.g., applying SN 1 through SN N to SDU 1 through SDU N, respectively). In some examples, the transmitting wireless device may concatenate the SDUs and applied SNs into a concatenated SDU using a concatenation buffer 405 (e.g., a concatenated SDU including each of SDU 1 through SDU N preceded by a corresponding SN). The transmitting wireless device may perform one or more PDCP layer functions on the concatenated SDU, such as ciphering and integrity protection 410, which may result in the transmitting wireless device applying a MAC-I field to the concatenated SDU.

Further, if the transmitting wireless device uses multiple concatenation buffers 405, the transmitting wireless device may apply a respective set of SNs to each set of SDUs input to a respective concatenation buffer 405 prior to concatenation. For example, the transmitting wireless device may apply a first set of SNs (e.g., SN 1 through SN N) to a first set of SDUs and may concatenate the first set of SDUs using a first concatenation buffer 405, and may apply a second set of SNs (e.g., SN N through SN M) to a second set of SDUs and may concatenate the second set of SDUs using a second concatenation buffer 405.

In some examples, ordering the concatenated SDUs according to the sequence numbering scheme 402 may support a one-to-one mapping between IP SNs and PDCP SNs (e.g., due to building the PDCP header ahead of concatenation), and may support a receiving wireless device reordering multiple concatenated SDUs concatenated using different concatenation buffers 405.

Figure 5A:
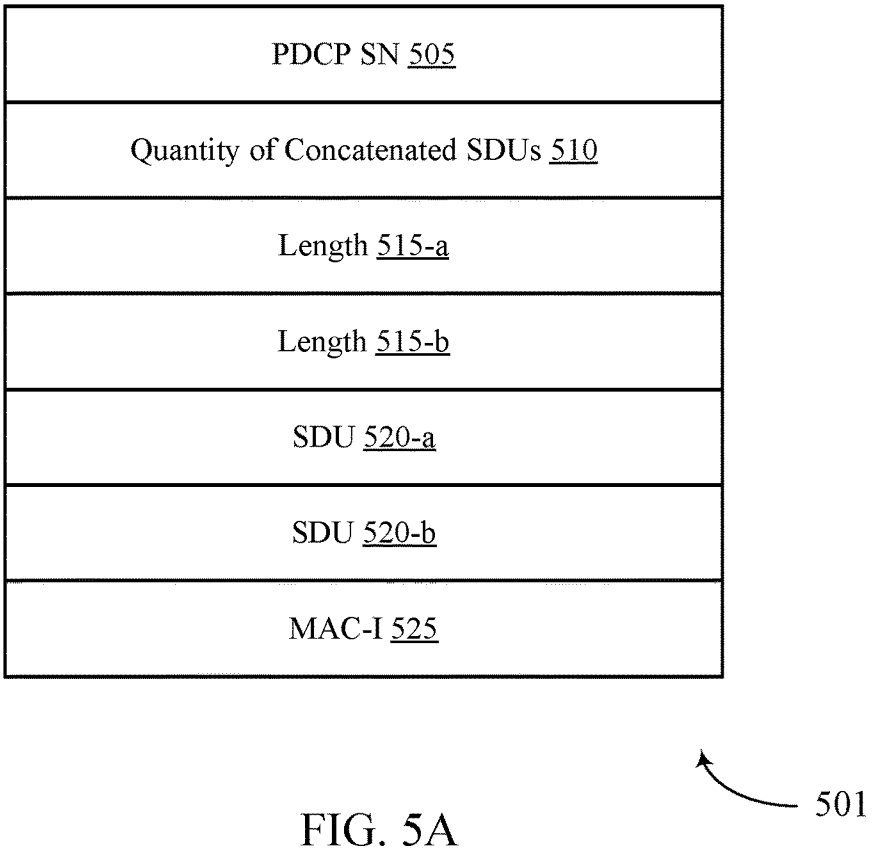
FIGS. 5A and 5B show examples of length subheader configurations that support multiple concatenation buffers at a PDCP layer in accordance with one or more aspects of the present disclosure.
Figure 5B:
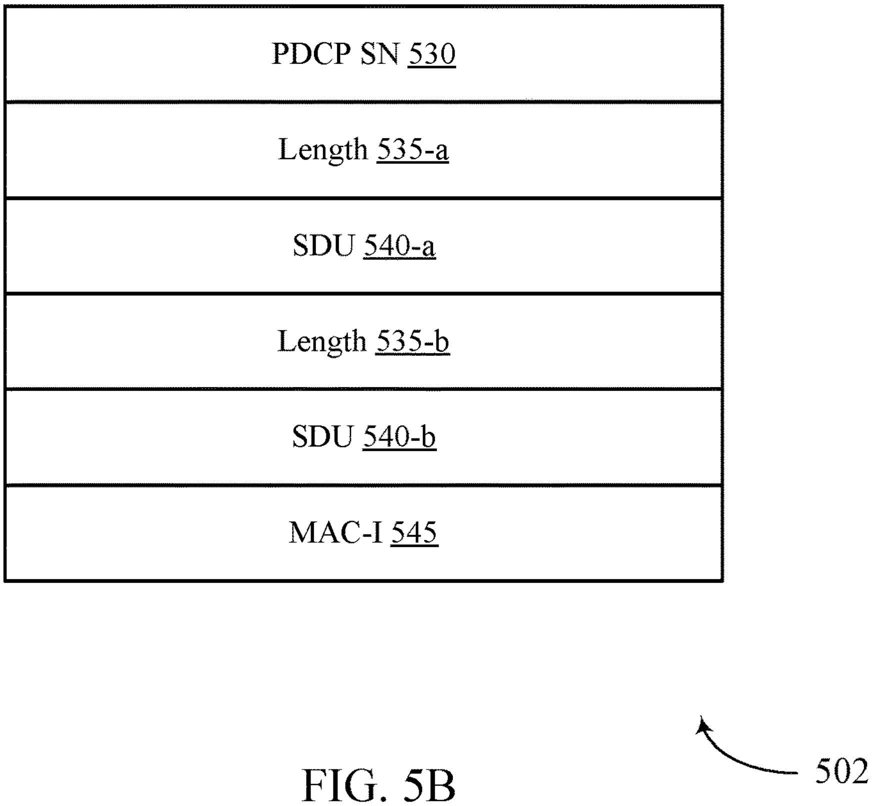

FIGS. 5A and 5B show examples of a length subheader configuration 501 and a length subheader configuration 502, respectively, that support multiple concatenation buffers at a PDCP layer in accordance with one or more aspects of the present disclosure. The length subheader configurations 501 and 502 may implement, or be implemented by, one or more aspects of the wireless communications systems 100 and 200, the PDCP configuration 300, and the sequence numbering schemes 401 and 402. For example, the length subheader configurations 501 and 502 may show examples of concatenated PDUs (e.g., concatenated SDUs with a PDCP header applied) generated by a transmitting wireless device at a PDCP layer, which may be examples of corresponding techniques and devices described with reference to FIGS. 1 through 4B. In some cases, the length subheader configurations 501 and 502 may support the transmitting wireless device including one or more length subheaders in a concatenated PDU (e.g., to indicate lengths of respective SDUs).

The length subheader configuration 501 shows an example of a first concatenated PDU generated by a transmitting wireless device (e.g., using a concatenation buffer and PDCP layer functions). The first concatenated PDU may include one or more fields, such as a PDCP SN field 505, a quantity of concatenated SDUs field 510 (e.g., indicating how many SDUs are included in the first concatenated PDU), one or more length fields 515 (e.g., length subheaders), one or more SDUs 520, a MAC-I field 525, or any combination thereof. In some cases, the one or more length fields 515 may indicate respective lengths (e.g., a packet size) associated with the one or more SDUs 520 included in the first concatenated SDU. For example, a length field 515-*a* may indicate a length of an SDU 520-*a* and a length field 515-*b* may indicate a length of an SDU 520-*b*, and including such length fields 515 may support the transmitting wireless device concatenating the corresponding SDUs 520.

In the example illustrated by the length subheader configuration 501, the transmitting wireless device may include the length fields 515 at a beginning of the concatenated PDU as part of a header (e.g., a main header, a PDCP header). A receiving wireless device may identify a correspondence between the one or more length fields 515 and the one or more SDUs 520 according to the quantity of concatenated SDUs field 510 and an order of the one or more length fields 515. As an example, the receiving wireless device may identify, via the quantity of concatenated SDUs field 510, that the first concatenated PDU includes two SDUs 520, and may determine that the length field 515-*a* corresponds to the SDU 520-*a* and the length field 515-*b* corresponds to the SDU 520-*b* based on the ordering of the length fields 515 and the SDUs 520 within the first concatenated PDU.

The length subheader configuration 502 shows an example of a second concatenated PDU generated by a transmitting wireless device (e.g., using a concatenation buffer and PDCP layer functions). The second concatenated PDU may include one or more fields, such as a PDCP SN field 530, one or more length fields 535 (e.g., length subheaders), one or more SDUs 540, a MAC-I field 545, or any combination thereof. In some cases, the one or more length fields 535 may indicate respective lengths (e.g., a packet size) associated with the one or more SDUs 540 included in the second concatenated PDU. For example, a length field 535-*a* may indicate a length of an SDU 540-*a* and a length field 535-*b* may indicate a length of an SDU 540-*b*, and including such length fields 535 may support the transmitting wireless device concatenating the corresponding SDUs 540.

In the example illustrated by the length subheader configuration 502, the transmitting wireless device may include each length field 535 before (e.g., directly prior to) a corresponding SDU 540 within the second concatenated PDU. For example, within the second concatenated PDU, the length field 535-*a* may be located before the SDU 540-*a* and the length field 535-*b* may be located before the SDU 540-*b*. In some cases, a receiving wireless device may identify the length fields 535 for each SDU 540 after decoding the concatenated PDU based on the length fields 535 being located before corresponding SDUs 540.

Figure 6:
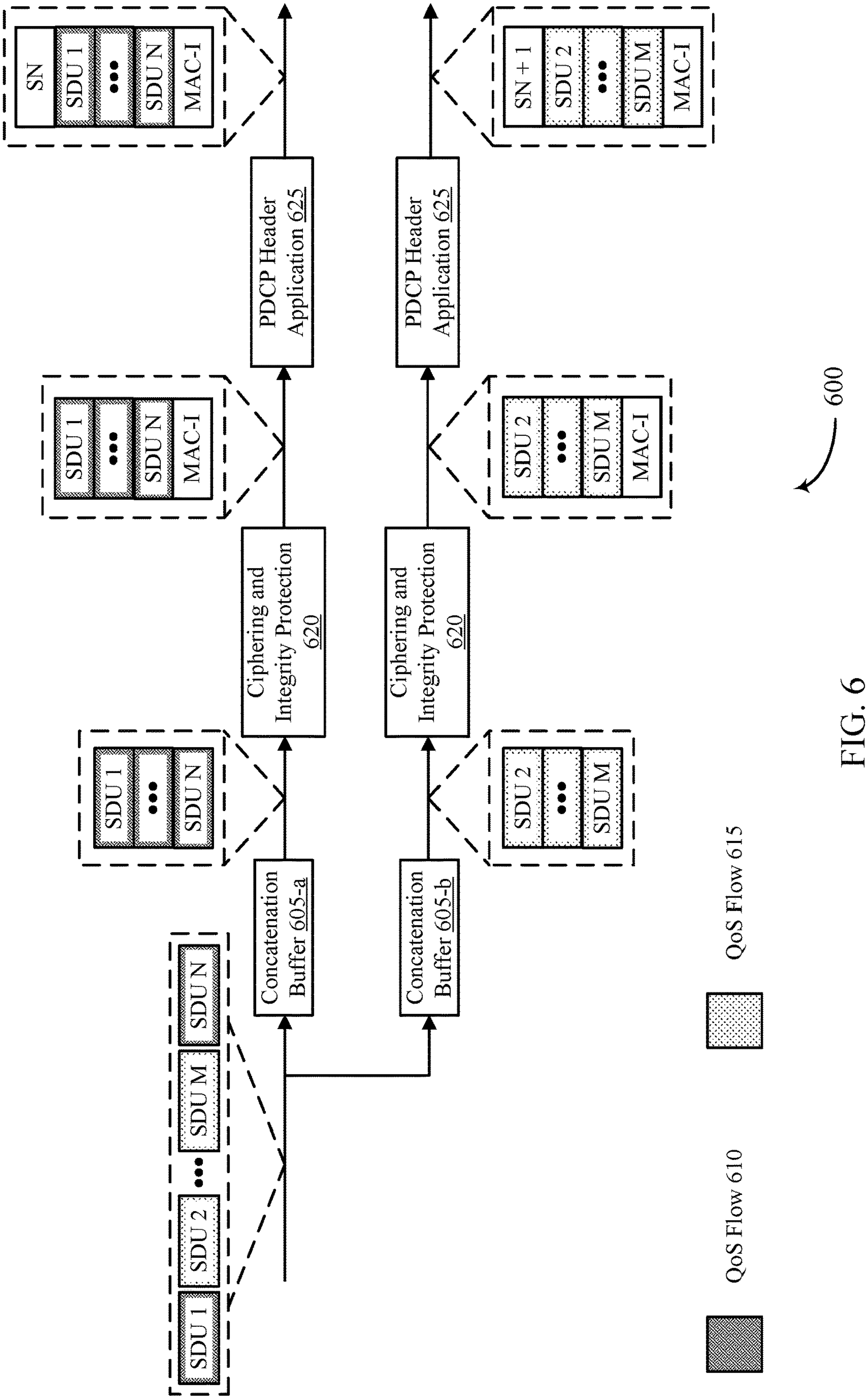
FIG. 6 shows an example of a service data unit (SDU) concatenation scheme that supports multiple concatenation buffers at a PDCP layer in accordance with one or more aspects of the present disclosure.

FIG. 6 shows an example of an SDU concatenation scheme 600 that supports multiple concatenation buffers at a PDCP layer in accordance with one or more aspects of the present disclosure. The SDU concatenation scheme 600 may implement, or be implemented by, one or more aspects of the wireless communications systems 100 and 200, the PDCP configuration 300, the sequence numbering schemes 401 and 402, and the length subheader configurations 501 and 502. For example, the SDU concatenation scheme 600 may support a transmitting wireless device concatenating SDUs at a PDCP layer using one or more concatenation buffers 605, which may be examples of corresponding devices and techniques described with reference to FIGS. 1 through 5B. In some cases, the SDU concatenation scheme 600 may show an example of the transmitting wireless device routing SDUs to respective concatenation buffers 605 based on a QoS flow. In some examples, SDUs may be routed to respective concatenation buffers 605 based on an RLC entity.

In some cases, a transmission buffer the transmitting wireless device may include a set of SDUs (e.g., SDU 1 through SDU N). The set of SDUs may be associated with different QoS flows, such as a QoS flow 610 and a QoS flow 615. For example, a first subset of the SDUs may be associated with the QoS flow 610 (e.g., including at least SDU 1 and SDU N) and a second subset of the SDUs may be associated with the QoS flow 615 (e.g., including at least SDU 2 and SDU M). In some cases, a concatenation buffer 605-*a* may be configured for the QoS flow 610 and a concatenation buffer 605-*b* may be configured for the QoS flow 615. For example, the concatenation buffer 605-*a* and the concatenation buffer 605-*b* may be configured with different concatenation timers according to constraints associated with the QoS flow 610 and the QoS flow 615.

The transmitting wireless device may route SDUs to a concatenation buffer 605 according to QoS flow. For example, the transmitting wireless device may route the first subset of the SDUs to the concatenation buffer 605-*a* to obtain a first concatenated SDU (e.g., including at least SDU 1 and SDU N). Similarly, the transmitting wireless device may route the second subset of the SDUs to the concatenation buffer 605-*b* to obtain a second concatenated SDU (e.g., including at least SDU 2 and SDU M). In some examples, the transmitting wireless device may perform one or more PDCP layer functions on the first concatenated SDU and the second concatenated SDU, such as ciphering and integrity protection 620, which may result in the transmitting wireless device applying a respective MAC-I field to the first concatenated SDU and the second concatenated SDU. Additionally, the transmitting wireless device may perform PDCP header application 625 on the first concatenated SDU and the second concatenated SDU, which may result in the transmitting wireless device applying a respective SN to the first concatenated SDU and the second concatenated SDU. For example, the transmitting wireless device may apply a first SN (e.g., SN) to the first concatenated SDU and may apply a second SN (e.g., SN+1) to the second concatenated SDU. In some examples, a value of the first SN may be less than a value of the second SN (e.g., ordered sequentially).

In some examples, concatenating SDUs and ordering concatenated SDUs according to QoS flow may support a receiving wireless device reordering SDUs when decoding multiple concatenated SDUs. For example, the receiving wireless device may identify an order the first concatenated SDU and the second concatenated SDU according to the first SN and the second SN, and may reorder the SDUs within the first concatenated SDU based on the QoS flow 610 and may reorder the SDUs within the second concatenated SDU based on the QoS flow 615 (e.g., despite not being aware of an order of the SDUs within a concatenated SDU).

Figure 7:
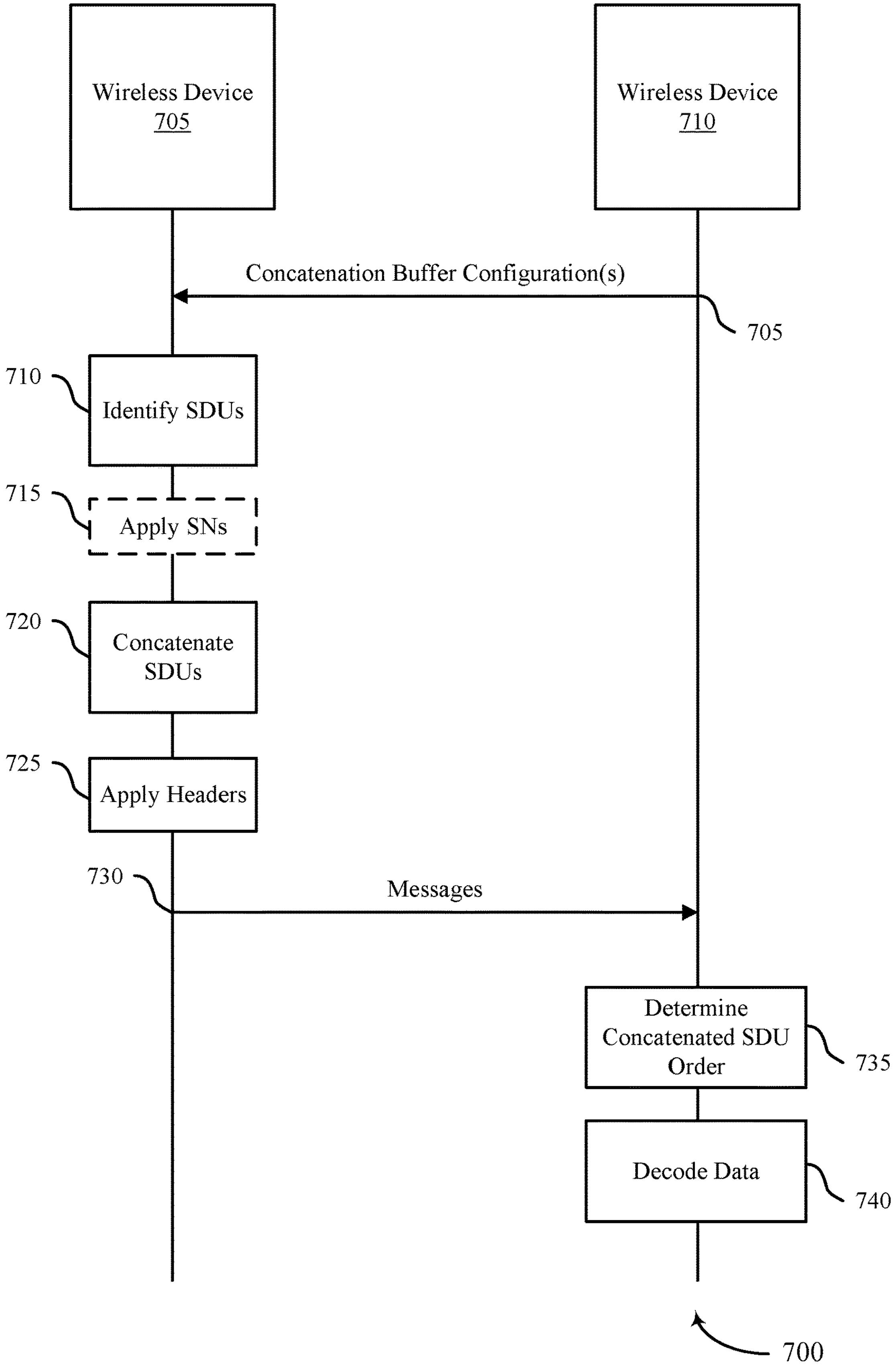
FIG. 7 shows an example of a process flow that supports multiple concatenation buffers at a PDCP layer in accordance with one or more aspects of the present disclosure.

FIG. 7 shows an example of a process flow 700 that supports multiple concatenation buffers at a PDCP layer in accordance with one or more aspects of the present disclosure. The process flow 700 may implement, or be implemented by, one or more aspects of the wireless communications systems 100 and 200, the PDCP configuration 300, the sequence numbering schemes 401 and 402, the length subheader configurations 501 and 502, and the SDU concatenation scheme 600. For example, the process flow 700 may show signaling between a wireless device 705 (e.g., a first wireless device) and a wireless device 710 (e.g., a second wireless device), which may be examples of a transmitting wireless device and a receiving wireless device, respectively, as described with reference to FIGS. 1 through 6. In some cases, the process flow 700 may support the wireless device 705 concatenating SDUs at a PDCP layer using one or more concatenation buffers as described with reference to FIGS. 2 through 6. Alternative examples of the following may be implemented, where some processes are performed in a different order than described or are not performed. In some cases, processes may include additional features not mentioned below, or further processes may be added.

At 705, the wireless device 705 may receive, from the wireless device 710, one or more control messages indicate a respective configuration of one or more concatenation buffers at the wireless device 705. In a first example, the wireless device 705 may receive a control message (e.g., an RRC message) indicating the configuration of each respective concatenation buffer when establishing a radio bearer with the wireless device 710. In a second example, the wireless device 705 may receive one or more control messages indicating the configuration of each respective concatenation buffer (e.g., a dynamic indication). In some examples, the configuration of each respective concatenation buffer may be based on a mapping between one or more concatenation parameters and a CQI value (e.g., a mapping configured for the wireless device 705).

At 710, the wireless device 705 may identify multiple SDUs. For example, the wireless device 705 may identify the multiple SDUs at a PDCP layer of the wireless device 705, where each SDU may be associated with data for transmission to the wireless device 710. In some cases, the wireless device 705 may identify the multiple SDUs in a transmission buffer of the wireless device 705.

At 715, the wireless device 705 may apply one or more SNs to the multiple SDUs included in the transmission buffer. For example, the wireless device may apply a respective SN to each SDU of the multiple SDUs included in the transmission buffer (e.g., prior to concatenation in accordance with techniques described with reference to FIG. 4B). In some cases, if the wireless device 705 concatenates multiple different sets of SDUs, the wireless device may apply a set of respective SNs corresponding to a set of SDUs included in a respective concatenated SDU.

At 720, the wireless device 705 may concatenate the multiple SDUs to obtain two or more concatenated SDUs. In some cases, the wireless device 705 may concatenate respective sets of SDUs using respective concatenation buffers of a set of multiple concatenation buffers based on a configuration of each respective concatenation buffer (e.g., the configurations indicated at 705). For example, the wireless device 705 may concatenate, via a first concatenation buffer, a first subset of SDUs of the multiple SDUs to obtain a first concatenated SDU and may concatenate, via a second concatenation buffer, a second subset of SDUs of the multiple SDUs to obtain a second concatenated SDU.

In some cases, the first concatenation buffer may be associated with a first configuration of a concatenation timer, a threshold SDU size, or both, where the first subset of SDUs may be concatenated in accordance with the first configuration. Similarly, the second concatenation buffer may be associated with a second configuration of the concatenation timer, the threshold SDU size, or both, where the second configuration may be different from the first configuration and the second subset of SDUs may be concatenated in accordance with the second configuration. Additionally, or alternatively, the wireless device 705 may concatenate the first subset of SDUs using the first concatenation buffer based on both the first subset of SDUs and the first concatenation buffer being associated with a first QoS flow, a first RLC entity, or both. Similarly, the wireless device 705 may concatenate the second subset of SDUs using the second concatenation buffer based on the second subset of SDUs and the second concatenation buffer being associated with a second QoS flow different from the first QoS flow, a second RLC entity different from the first RLC entity, or both.

At 725, the wireless device 705 may apply one or more headers to the two or more concatenated SDUs. For example, the wireless device 705 may apply a first PDCP header to the first concatenated SDU after performing ciphering and integrity protection for the first concatenated SDU and may apply a second PDCP header to the second concatenated SDU after performing ciphering and integrity protection for the second concatenated SDU. In some cases, as part of applying the first PDCP header and the second PDCP header, the wireless device 705 apply a first SN associated with the first concatenated SDU to the first concatenated SDU and may apply a second SN associated with the second concatenated SDU to the second concatenated SDU (e.g., sequence numbering after concatenation as described with reference to FIG. 4A). In some cases, a value of the first SN associated with the first concatenated SDU may be less than a value of the second SN associated with the second concatenated SDU (e.g., sequentially ordered on a per-concatenated SDU basis).

Additionally, or alternatively, the wireless device 705 may append one or more length subheaders to the two or more concatenated SDUs. For example, the wireless device 705 may append a respective set of multiple length subheaders for each concatenated SDU, where each length subheader may indicate a size of a corresponding SDU included in a respective concatenated SDU. In some cases, each of the multiple length subheaders may be included in a header of a corresponding concatenated SDU, as described with reference to FIG. 5A. Alternatively, each length subheader of the respective set of multiple length subheaders may be located before the corresponding SDU included in the respective concatenated SDU, as described with reference to FIG. 5B.

At 730, the wireless device 705 may transmit, to the wireless device 710, one or more messages including the two more concatenated SDUs. For example, the wireless device 705 may process the two or more concatenated SDUs via one or more layers of a protocol stack subsequent to the PDCP layers to generate the one or more messages.

At 735, the wireless device 710 may determine an order of the two or more concatenated SDUs and the respective sets of SDUs included in each concatenated SDU based on receiving the one or more messages. For example, the wireless device 710 may determine the order of the first concatenated SDU and the second concatenated SDU based on the first SN associated with the first concatenated SDU and the second SN associated with the second concatenated SDU. Additionally, or alternatively, the wireless device 710 may identify the order of the first concatenated SDU and the second concatenated SDU based on the first concatenated SDU being associated with a first QoS flow and the second concatenated SDU being associated with a second QoS flow different from the first QoS flow.

In some examples, the wireless device may determine an order of the respective sets of SDUs included in the concatenated SDUs based on the order of the first concatenated SDU and the second concatenated SDU. For example, the wireless device may identify, within each concatenated SDU, a respective SN for each SDU of the respective sets of SDUs, where the order of the respective sets of SDUs is based on the respective SNs.

At 740, the wireless device 710 may decode the data for the wireless device 710 in accordance with the order of the respective sets of SDUs included in each concatenated SDU and based on the one or more SNs included in each concatenated SDU. In some cases, y implementing multiple concatenation buffers at the PDCP layer, latency, processing time, and overhead associated with PDCP processing and communication may be reduced, thereby improving a throughput of the wireless device 705 and the wireless device 710.

Figure 8:
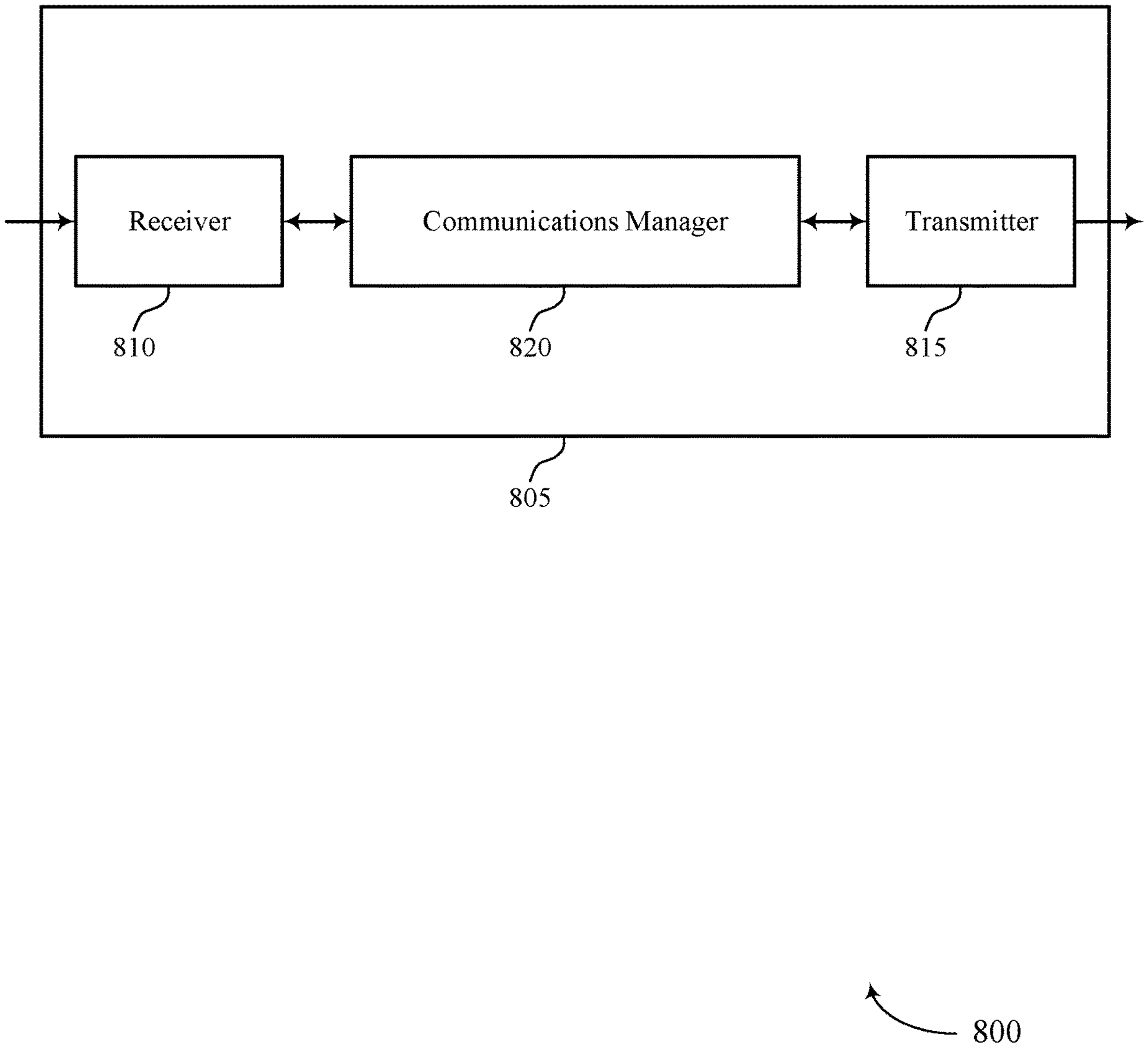
FIGS. 8 and 9 show block diagrams of devices that support multiple concatenation buffers at a PDCP layer in accordance with one or more aspects of the present disclosure.

FIG. 8 shows a block diagram 800 of a device 805 that supports multiple concatenation buffers at a PDCP layer in accordance with one or more aspects of the present disclosure. The device 805 may be an example of aspects of a UE 115 or a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to multiple concatenation buffers at a PDCP layer). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiple concatenation buffers at a PDCP layer). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multiple concatenation buffers at a PDCP layer as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for identifying a set of multiple SDUs at a PDCP layer of the first wireless device, each SDU associated with data for transmission to a second wireless device. The communications manager 820 is capable of, configured to, or operable to support a means for concatenating the set of multiple SDUs to obtain two or more concatenated SDUs, where respective sets of SDUs are concatenated using respective concatenation buffers of a set of multiple concatenation buffers based on a configuration of each respective concatenation buffer. The communications manager 820 is capable of, configured to, or operable to support a means for transmitting, to the second wireless device, one or more messages including the two or more concatenated SDUs.

Additionally, or alternatively, the communications manager 820 may support wireless communications in accordance with examples as disclosed herein. For example, the communications manager 820 is capable of, configured to, or operable to support a means for receiving, from a second wireless device, one or more messages including two or more concatenated SDUs, where each concatenated SDU of the two or more concatenated SDUs includes a respective set of SDUs associated with data for the first wireless device. The communications manager 820 is capable of, configured to, or operable to support a means for decoding the data for the first wireless device in accordance with an order of the respective sets of SDUs included in each concatenated SDU and based on one or more SNs included in each concatenated SDU.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reducing L2 processing complexity at a PDCP layer of a transmitting wireless device by utilizing multiple concatenation buffers to concatenate PDCP SDUs, thereby improving throughput of the transmitting wireless device.

Figure 9:
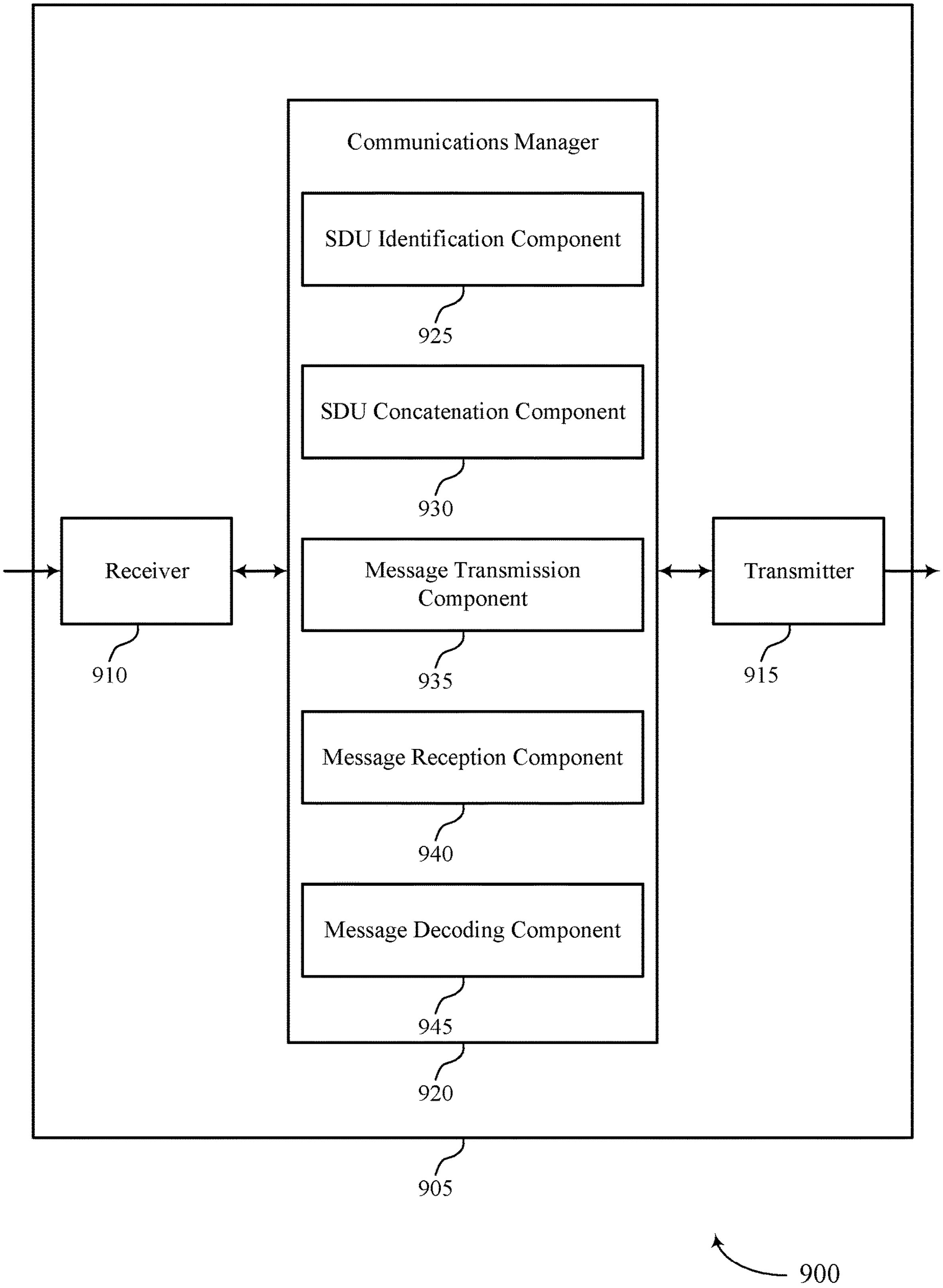

FIG. 9 shows a block diagram 900 of a device 905 that supports multiple concatenation buffers at a PDCP layer in accordance with one or more aspects of the present disclosure. The device 905 may be an example of aspects of a device 805, a UE 115, or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to multiple concatenation buffers at a PDCP layer). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multiple concatenation buffers at a PDCP layer). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multiple concatenation buffers at a PDCP layer as described herein. For example, the communications manager 920 may include an SDU identification component 925, an SDU concatenation component 930, a message transmission component 935, a message reception component 940, a message decoding component 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The SDU identification component 925 is capable of, configured to, or operable to support a means for identifying a set of multiple SDUs at a PDCP layer of the first wireless device, each SDU associated with data for transmission to a second wireless device. The SDU concatenation component 930 is capable of, configured to, or operable to support a means for concatenating the set of multiple SDUs to obtain two or more concatenated SDUs, where respective sets of SDUs are concatenated using respective concatenation buffers of a set of multiple concatenation buffers based on a configuration of each respective concatenation buffer. The message transmission component 935 is capable of, configured to, or operable to support a means for transmitting, to the second wireless device, one or more messages including the two or more concatenated SDUs.

Additionally, or alternatively, the communications manager 920 may support wireless communications in accordance with examples as disclosed herein. The message reception component 940 is capable of, configured to, or operable to support a means for receiving, from a second wireless device, one or more messages including two or more concatenated SDUs, where each concatenated SDU of the two or more concatenated SDUs includes a respective set of SDUs associated with data for the first wireless device. The message decoding component 945 is capable of, configured to, or operable to support a means for decoding the data for the first wireless device in accordance with an order of the respective sets of SDUs included in each concatenated SDU and based on one or more SNs included in each concatenated SDU.

Figure 10:
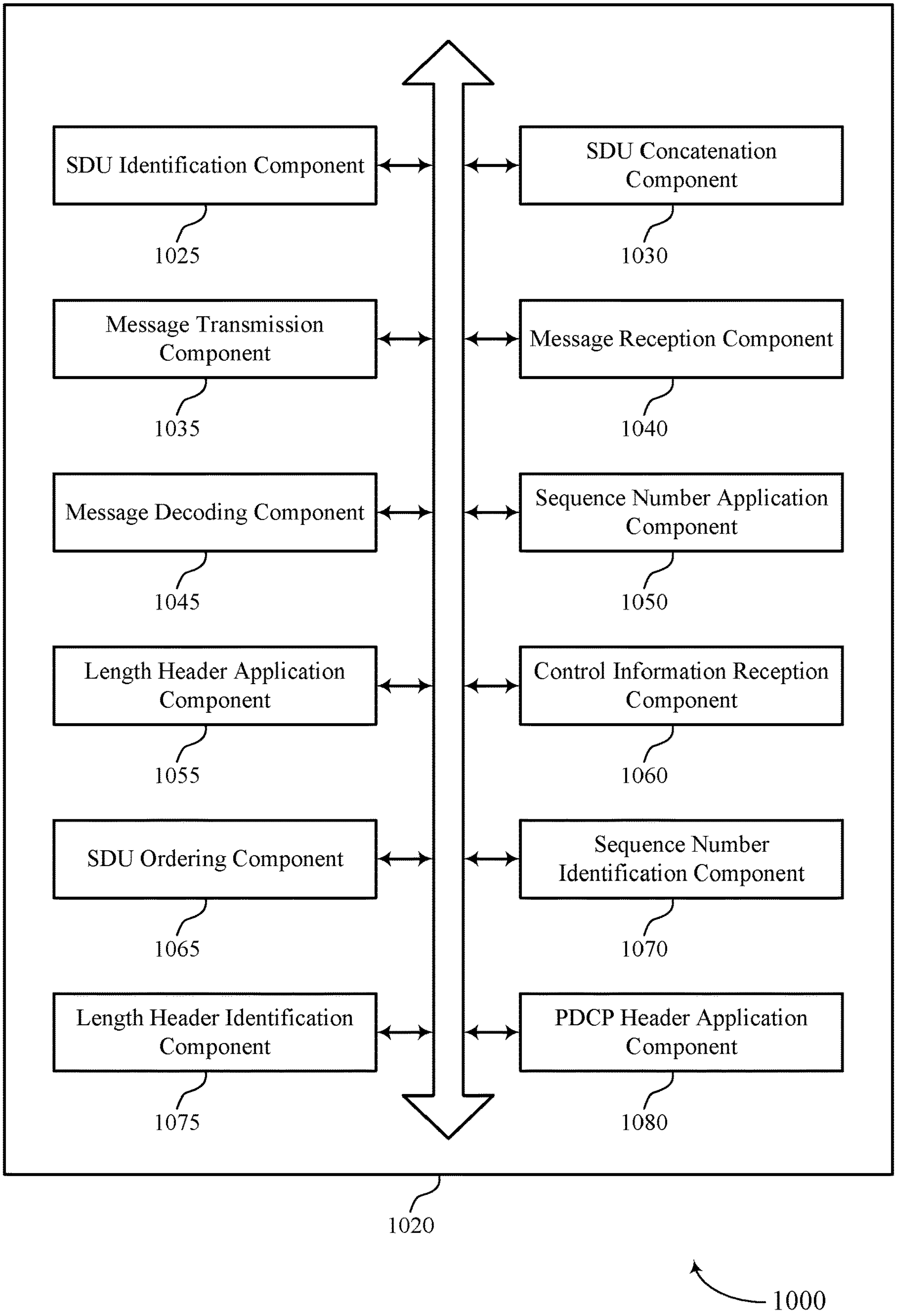
FIG. 10 shows a block diagram of a communications manager that supports multiple concatenation buffers at a PDCP layer in accordance with one or more aspects of the present disclosure.

FIG. 10 shows a block diagram 1000 of a communications manager 1020 that supports multiple concatenation buffers at a PDCP layer in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of multiple concatenation buffers at a PDCP layer as described herein. For example, the communications manager 1020 may include an SDU identification component 1025, an SDU concatenation component 1030, a message transmission component 1035, a message reception component 1040, a message decoding component 1045, a SN application component 1050, a length header application component 1055, a control information reception component 1060, an SDU ordering component 1065, a SN identification component 1070, a length header identification component 1075, a PDCP header application component 1080, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The SDU identification component 1025 is capable of, configured to, or operable to support a means for identifying a set of multiple SDUs at a PDCP layer of the first wireless device, each SDU associated with data for transmission to a second wireless device. The SDU concatenation component 1030 is capable of, configured to, or operable to support a means for concatenating the set of multiple SDUs to obtain two or more concatenated SDUs, where respective sets of SDUs are concatenated using respective concatenation buffers of a set of multiple concatenation buffers based on a configuration of each respective concatenation buffer. The message transmission component 1035 is capable of, configured to, or operable to support a means for transmitting, to the second wireless device, one or more messages including the two or more concatenated SDUs.

In some examples, to support concatenating the set of multiple SDUs, the SDU concatenation component 1030 is capable of, configured to, or operable to support a means for concatenating, via a first concatenation buffer, a first subset of SDUs of the set of multiple SDUs to obtain a first concatenated SDU. In some examples, to support concatenating the set of multiple SDUs, the SDU concatenation component 1030 is capable of, configured to, or operable to support a means for concatenating, via a second concatenation buffer, a second subset of SDUs of the set of multiple SDUs to obtain a second concatenated SDU.

In some examples, the first concatenation buffer is associated with first configuration of a concatenation timer, a threshold SDU size, or both, where the first subset of SDUs is concatenated in accordance with the first configuration; and the second concatenation buffer is associated with a second configuration of the concatenation timer, the threshold SDU size, or both, the second configuration different from the first configuration, where the second subset of SDUs is concatenated in accordance with the second configuration.

In some examples, the first subset of SDUs is concatenated via the first concatenation buffer based on both the first subset of SDUs and the first concatenation buffer associated with a first QoS flow, a first RLC entity, or both; and the second subset of SDUs is concatenated via the second concatenation buffer based on the second subset of SDUs and the second concatenation buffer being associated with a second QoS flow different from the first QoS flow, a second RLC entity different from the first RLC entity, or both.

In some examples, the PDCP header application component 1080 is capable of, configured to, or operable to support a means for applying a first PDCP header to the first concatenated SDU after performing ciphering and integrity protection for the first concatenated SDU, the first PDCP header including a first SN associated with the first concatenated SDU. In some examples, the PDCP header application component 1080 is capable of, configured to, or operable to support a means for applying a second PDCP header to the second concatenated SDU after performing ciphering and integrity protection for the second concatenated SDU, the second PDCP header including a second SN associated with the first concatenated SDU.

In some examples, a value of the first SN associated with the first concatenated SDU is less than a value of the second SN associated with the second concatenated SDU from the second concatenation buffer.

In some examples, the SN application component 1050 is capable of, configured to, or operable to support a means for applying, prior to concatenating the set of multiple SDUs, a respective SN to each SDU of the set of multiple SDUs, where each concatenated SDU of the two or more concatenated SDUs includes a set of respective SNs corresponding to a set of SDUs included in a respective concatenated SDU.

In some examples, the length header application component 1055 is capable of, configured to, or operable to support a means for appending a respective set of multiple length subheaders for each concatenated SDU, each length subheader indicating a size of a corresponding SDU included in a respective concatenated SDU.

In some examples, each set of multiple length subheaders is included in a header of a corresponding concatenated SDU. In some examples, each length subheader of the respective set of multiple length subheaders is located before the corresponding SDU included in the respective concatenated SDU.

In some examples, the control information reception component 1060 is capable of, configured to, or operable to support a means for receiving, when establishing a radio bearer with the second wireless device, a control message indicating the configuration of each respective concatenation buffer, where concatenating the set of multiple SDUs is based on receiving the control message.

In some examples, the control information reception component 1060 is capable of, configured to, or operable to support a means for receiving one or more control messages indicating the configuration of each respective concatenation buffer, where concatenating the set of multiple SDUs is based on receiving the one or more control messages. In some examples, the configuration of each respective concatenation buffer is based on a mapping between one or more concatenation parameters and a channel quality index value.

Additionally, or alternatively, the communications manager 1020 may support wireless communications in accordance with examples as disclosed herein. The message reception component 1040 is capable of, configured to, or operable to support a means for receiving, from a second wireless device, one or more messages including two or more concatenated SDUs, where each concatenated SDU of the two or more concatenated SDUs includes a respective set of SDUs associated with data for the first wireless device. The message decoding component 1045 is capable of, configured to, or operable to support a means for decoding the data for the first wireless device in accordance with an order of the respective sets of SDUs included in each concatenated SDU and based on one or more SNs included in each concatenated SDU.

In some examples, to support receiving the one or more messages, the message reception component 1040 is capable of, configured to, or operable to support a means for receiving a first concatenated SDU and a second concatenated SDU, the first concatenated SDU including a first SN and the second concatenated SDU including a second SN different from the first SN. In some examples, to support receiving the one or more messages, the SDU ordering component 1065 is capable of, configured to, or operable to support a means for determining an order of the first concatenated SDU and the second concatenated SDU based on the first SN and the second SN, where the order of the respective sets of SDUs is based on the order of the first concatenated SDU and the second concatenated SDU.

In some examples, the order of the first concatenated SDU and the second concatenated SDU is based on the first concatenated SDU being associated with a first QoS flow and the second concatenated SDU being associated with a second QoS flow different from the first QoS flow.

In some examples, the SN identification component 1070 is capable of, configured to, or operable to support a means for identifying, within each concatenated SDU, a respective SN for each SDU of the respective sets of SDUs, where the order of the respective sets of SDU is based on the respective SNs.

In some examples, the length header identification component 1075 is capable of, configured to, or operable to support a means for identifying a respective set of multiple length subheaders for each concatenated SDU of the two or more concatenated SDUs, each length subheader indicating a size of a corresponding SDU included in a respective concatenated SDU, where decoding the data is based on the respective set of multiple length subheaders.

In some examples, each set of multiple length subheaders is included in a header of a corresponding concatenated SDU. In some examples, each length subheader of the respective set of multiple length subheaders is located before the corresponding SDU included in the respective concatenated SDU.

Figure 11:
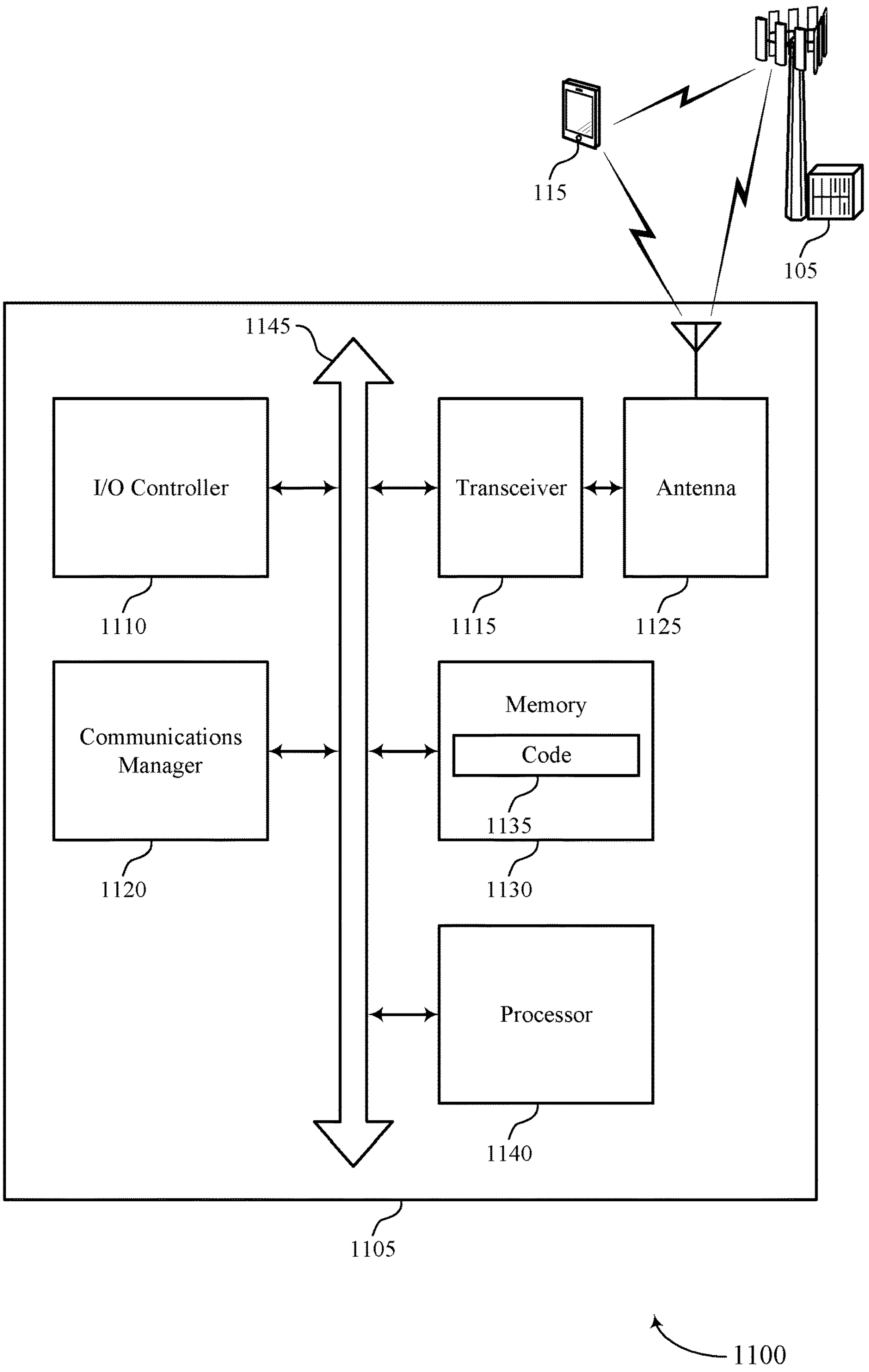
FIG. 11 shows a diagram of a system including a UE that supports multiple concatenation buffers at a PDCP layer in accordance with one or more aspects of the present disclosure.

FIG. 11 shows a diagram of a system 1100 including a device 1105 that supports multiple concatenation buffers at a PDCP layer in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting multiple concatenation buffers at a PDCP layer). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. As such, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for identifying a set of multiple SDUs at a PDCP layer of the first wireless device, each SDU associated with data for transmission to a second wireless device. The communications manager 1120 is capable of, configured to, or operable to support a means for concatenating the set of multiple SDUs to obtain two or more concatenated SDUs, where respective sets of SDUs are concatenated using respective concatenation buffers of a set of multiple concatenation buffers based on a configuration of each respective concatenation buffer. The communications manager 1120 is capable of, configured to, or operable to support a means for transmitting, to the second wireless device, one or more messages including the two or more concatenated SDUs.

Additionally, or alternatively, the communications manager 1120 may support wireless communications in accordance with examples as disclosed herein. For example, the communications manager 1120 is capable of, configured to, or operable to support a means for receiving, from a second wireless device, one or more messages including two or more concatenated SDUs, where each concatenated SDU of the two or more concatenated SDUs includes a respective set of SDUs associated with data for the first wireless device. The communications manager 1120 is capable of, configured to, or operable to support a means for decoding the data for the first wireless device in accordance with an order of the respective sets of SDUs included in each concatenated SDU and based on one or more SNs included in each concatenated SDU.

By including or configuring the communications manager 1120 in accordance with examples as described herein, the device 1105 may support techniques for reducing L2 processing complexity at a PDCP layer of a transmitting wireless device by utilizing multiple concatenation buffers to concatenate PDCP SDUs, thereby improving throughput of the transmitting wireless device.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of multiple concatenation buffers at a PDCP layer as described herein, or the at least one processor 1140 and the at least one memory 1130 may be otherwise configured to, individually or collectively, perform or support such operations.

Figure 12:
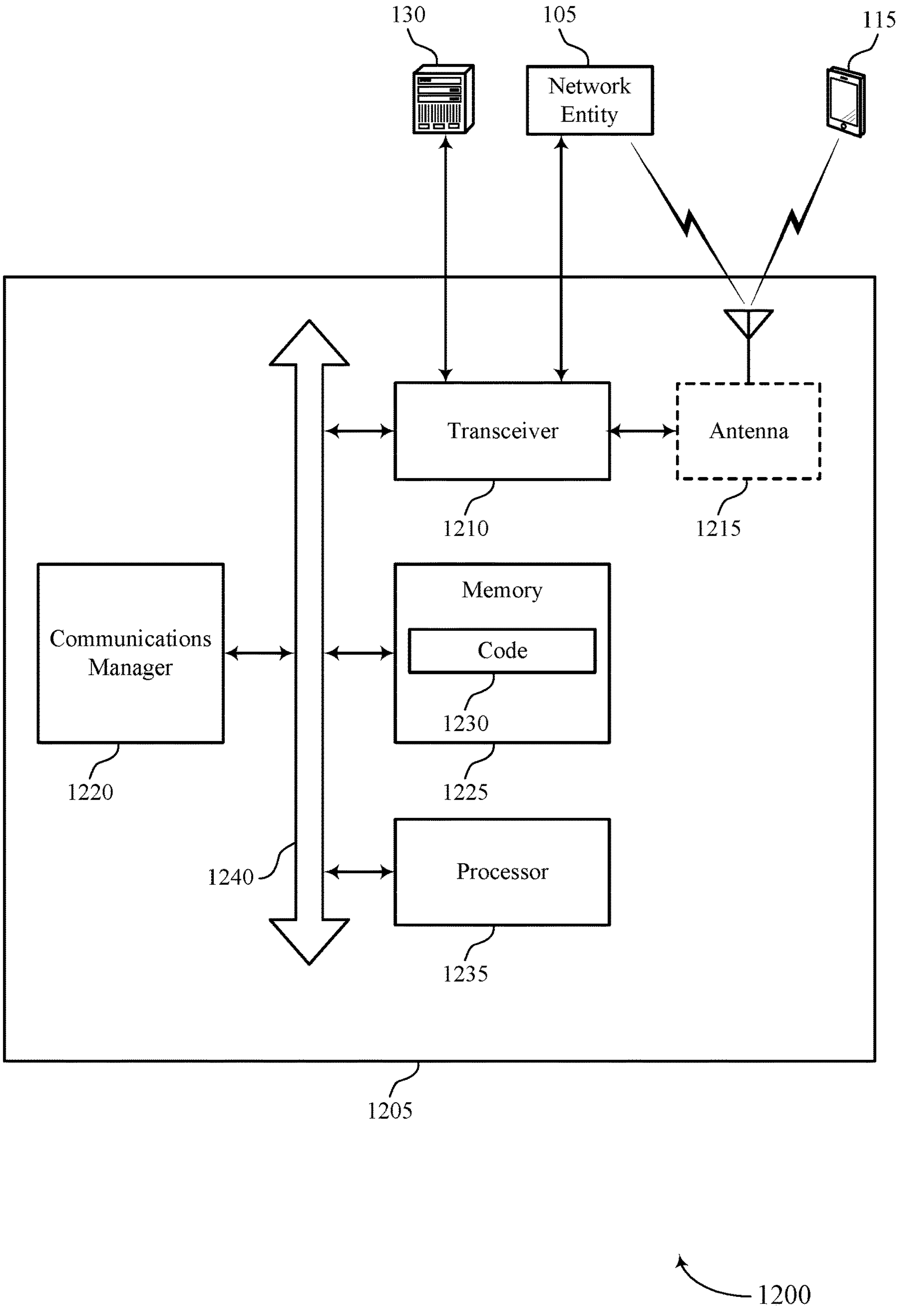
FIG. 12 shows a diagram of a system including a network entity that supports multiple concatenation buffers at a PDCP layer in accordance with one or more aspects of the present disclosure.

FIG. 12 shows a diagram of a system 1200 including a device 1205 that supports multiple concatenation buffers at a PDCP layer in accordance with one or more aspects of the present disclosure. The device 1205 may be an example of or include the components of a device 805, a device 905, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting multiple concatenation buffers at a PDCP layer). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for identifying a set of multiple SDUs at a PDCP layer of the first wireless device, each SDU associated with data for transmission to a second wireless device. The communications manager 1220 is capable of, configured to, or operable to support a means for concatenating the set of multiple SDUs to obtain two or more concatenated SDUs, where respective sets of SDUs are concatenated using respective concatenation buffers of a set of multiple concatenation buffers based on a configuration of each respective concatenation buffer. The communications manager 1220 is capable of, configured to, or operable to support a means for transmitting, to the second wireless device, one or more messages including the two or more concatenated SDUs.

Additionally, or alternatively, the communications manager 1220 may support wireless communications in accordance with examples as disclosed herein. For example, the communications manager 1220 is capable of, configured to, or operable to support a means for receiving, from a second wireless device, one or more messages including two or more concatenated SDUs, where each concatenated SDU of the two or more concatenated SDUs includes a respective set of SDUs associated with data for the first wireless device. The communications manager 1220 is capable of, configured to, or operable to support a means for decoding the data for the first wireless device in accordance with an order of the respective sets of SDUs included in each concatenated SDU and based on one or more SNs included in each concatenated SDU.

By including or configuring the communications manager 1220 in accordance with examples as described herein, the device 1205 may support techniques for reducing L2 processing complexity at a PDCP layer of a transmitting wireless device by utilizing multiple concatenation buffers to concatenate PDCP SDUs, thereby improving throughput of the transmitting wireless device.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of multiple concatenation buffers at a PDCP layer as described herein, or the at least one processor 1235 and the at least one memory 1225 may be otherwise configured to, individually or collectively, perform or support such operations.

Figure 13:
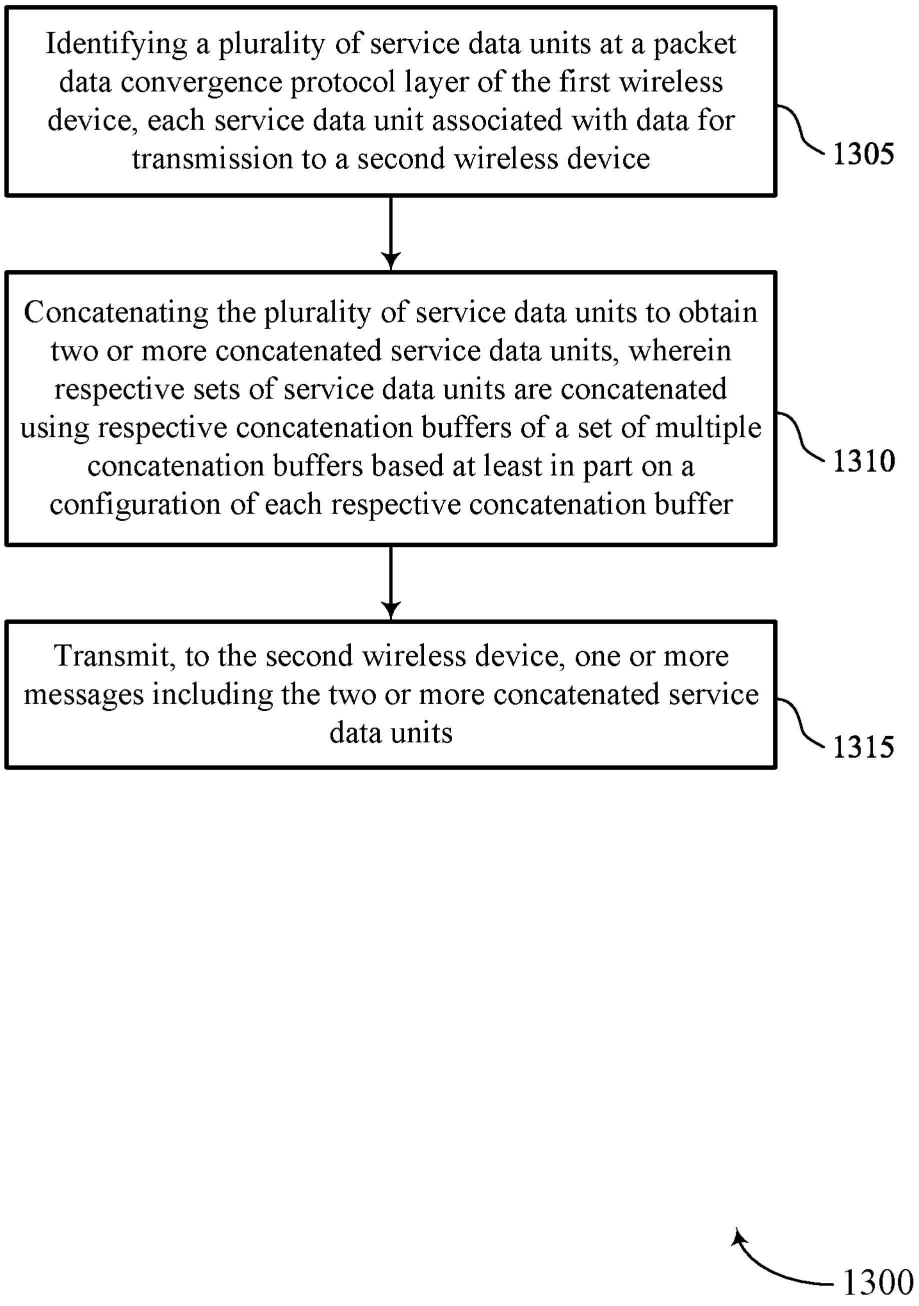
FIGS. 13 and 14 show flowcharts illustrating methods that support multiple concatenation buffers at a PDCP layer in accordance with one or more aspects of the present disclosure.

FIG. 13 shows a flowchart illustrating a method 1300 that supports multiple concatenation buffers at a PDCP layer in accordance with one or more aspects of the present disclosure. The operations of the method 1300 may be implemented by a wireless device (e.g., a UE, a network entity) or its components as described herein. For example, the operations of the method 1300 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include identifying a set of multiple SDUs at a PDCP layer of the first wireless device, each SDU associated with data for transmission to a second wireless device. The operations of 1305 may be performed in accordance with examples as disclosed herein. In some examples, aspects of the operations of 1305 may be performed by an SDU identification component 1025 as described with reference to FIG. 10.

At 1310, the method may include concatenating the set of multiple SDUs to obtain two or more concatenated SDUs, where respective sets of SDUs are concatenated using respective concatenation buffers of a set of multiple concatenation buffers based on a configuration of each respective concatenation buffer. The operations of 1310 may be performed in accordance with examples as disclosed herein. In some examples, aspects of the operations of 1310 may be performed by an SDU concatenation component 1030 as described with reference to FIG. 10.

At 1315, the method may include transmitting, to the second wireless device, one or more messages including the two or more concatenated SDUs. The operations of 1315 may be performed in accordance with examples as disclosed herein. In some examples, aspects of the operations of 1315 may be performed by a message transmission component 1035 as described with reference to FIG. 10.

Figure 14:
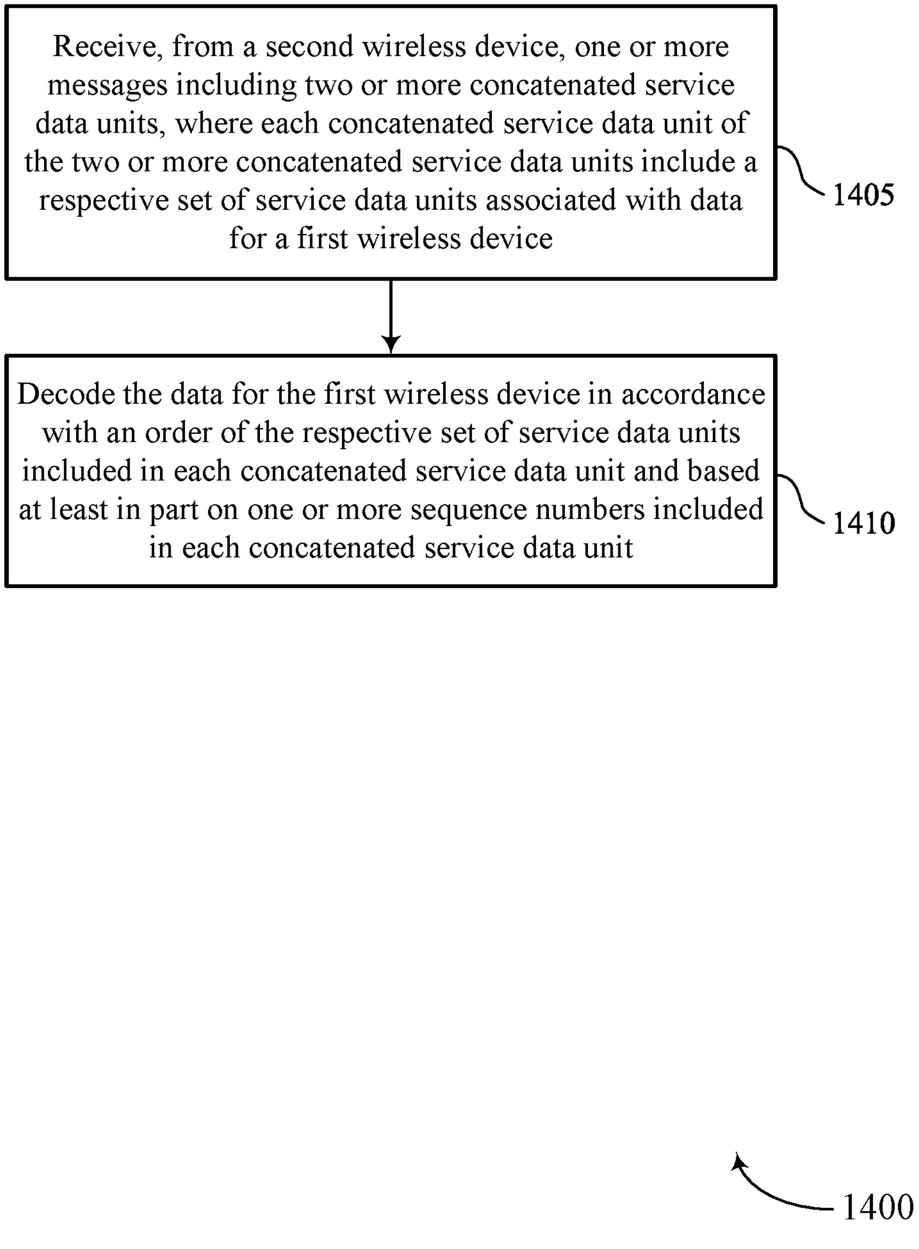

FIG. 14 shows a flowchart illustrating a method 1400 that supports multiple concatenation buffers at a PDCP layer in accordance with one or more aspects of the present disclosure. The operations of the method 1400 may be implemented by a wireless device (e.g., a UE, a network entity) or its components as described herein. For example, the operations of the method 1400 may be performed by a UE 115 or a network entity as described with reference to FIGS. 1 through 12. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1405, the method may include receiving, from a second wireless device, one or more messages including two or more concatenated SDUs, where each concatenated SDU of the two or more concatenated SDUs includes a respective set of SDUs associated with data for the first wireless device. The operations of 1405 may be performed in accordance with examples as disclosed herein. In some examples, aspects of the operations of 1405 may be performed by a message reception component 1040 as described with reference to FIG. 10.

At 1410, the method may include decoding the data for the first wireless device in accordance with an order of the respective sets of SDUs included in each concatenated SDU and based on one or more SNs included in each concatenated SDU. The operations of 1410 may be performed in accordance with examples as disclosed herein. In some examples, aspects of the operations of 1410 may be performed by a message decoding component 1045 as described with reference to FIG. 10.

The following provides an overview of aspects of the present disclosure:

Aspect 1: A method for wireless communications at a first wireless device, comprising: identifying a plurality of SDUs at a PDCP layer of the first wireless device, each SDU associated with data for transmission to a second wireless device; concatenating the plurality of SDUs to obtain two or more concatenated SDUs, wherein respective sets of SDUs are concatenated using respective concatenation buffers of a plurality of concatenation buffers based at least in part on a configuration of each respective concatenation buffer; and transmitting, to the second wireless device, one or more messages comprising the two or more concatenated SDUs.

Aspect 2: The method of aspect 1, wherein concatenating the plurality of SDUs comprises: concatenating, via a first concatenation buffer, a first subset of SDUs of the plurality of SDUs to obtain a first concatenated SDU; and concatenating, via a second concatenation buffer, a second subset of SDUs of the plurality of SDUs to obtain a second concatenated SDU.

Aspect 3: The method of aspect 2, wherein the first concatenation buffer is associated with first configuration of a concatenation timer, a threshold SDU size, or both, wherein the first subset of SDUs is concatenated in accordance with the first configuration; and the second concatenation buffer is associated with a second configuration of the concatenation timer, the threshold SDU size, or both, the second configuration different from the first configuration, wherein the second subset of SDUs is concatenated in accordance with the second configuration.

Aspect 4: The method of any of aspects 2 through 3, wherein the first subset of SDUs is concatenated via the first concatenation buffer based at least in part on both the first subset of SDUs and the first concatenation buffer associated with a first QoS flow, a first RLC entity, or both; and the second subset of SDUs is concatenated via the second concatenation buffer based at least in part on the second subset of SDUs and the second concatenation buffer being associated with a second QoS flow different from the first QoS flow, a second RLC entity different from the first RLC entity, or both.

Aspect 5: The method of any of aspects 2 through 4, further comprising: applying a first PDCP header to the first concatenated SDU after performing ciphering and integrity protection for the first concatenated SDU, the first PDCP header comprising a first SN associated with the first concatenated SDU; applying a second PDCP header to the second concatenated SDU after performing ciphering and integrity protection for the second concatenated SDU, the second PDCP header comprising a second SN associated with the first concatenated SDU.

Aspect 6: The method of aspect 5, wherein a value of the first SN associated with the first concatenated SDU is less than a value of the second SN associated with the second concatenated SDU from the second concatenation buffer.

Aspect 7: The method of any of aspects 1 through 6, further comprising: applying, prior to concatenating the plurality of SDUs, a respective SN to each SDU of the plurality of SDUs, wherein each concatenated SDU of the two or more concatenated SDUs includes a set of respective SNs corresponding to a set of SDUs included in a respective concatenated SDU.

Aspect 8: The method of any of aspects 1 through 7, further comprising: appending a respective plurality of length subheaders for each concatenated SDU, each length subheader indicating a size of a corresponding SDU included in a respective concatenated SDU.

Aspect 9: The method of aspect 8, wherein each plurality of length subheaders is included in a header of a corresponding concatenated SDU.

Aspect 10: The method of aspect 8, wherein each length subheader of the respective plurality of length subheaders is located before the corresponding SDU included in the respective concatenated SDU.

Aspect 11: The method of any of aspects 1 through 10, further comprising: receiving, when establishing a radio bearer with the second wireless device, a control message indicating the configuration of each respective concatenation buffer, wherein concatenating the plurality of SDUs is based at least in part on receiving the control message.

Aspect 12: The method of any of aspects 1 through 10, further comprising: receiving one or more control messages indicating the configuration of each respective concatenation buffer, wherein concatenating the plurality of SDUs is based at least in part on receiving the one or more control messages.

Aspect 13: The method of any of aspects 1 through 10, wherein the configuration of each respective concatenation buffer is based at least in part on a mapping between one or more concatenation parameters and a channel quality index value.

Aspect 14: A method for wireless communications at a first wireless device, comprising: receiving, from a second wireless device, one or more messages comprising two or more concatenated SDUs, wherein each concatenated SDU of the two or more concatenated SDUs include a respective set of SDUs associated with data for the first wireless device; and decoding the data for the first wireless device in accordance with an order of the respective set of SDUs included in each concatenated SDU and based at least in part on one or more SNs included in each concatenated SDU.

Aspect 15: The method of aspect 14, wherein receiving the one or more messages comprises: receiving a first concatenated SDU and a second concatenated SDU, the first concatenated SDU comprising a first SN and the second concatenated SDU comprising a second SN different from the first SN, the method further comprising: determining an order of the first concatenated SDU and the second concatenated SDU based at least in part on the first SN and the second SN, wherein the order of the respective set of SDUs is based at least in part on the order of the first concatenated SDU and the second concatenated SDU.

Aspect 16: The method of aspect 15, wherein the order of the first concatenated SDU and the second concatenated SDU is based at least in part on the first concatenated SDU being associated with a first QoS flow and the second concatenated SDU being associated with a second QoS flow different from the first QoS flow.

Aspect 17: The method of any of aspects 14 through 16, further comprising: identifying, within each concatenated SDU, a respective SN for each SDU of the respective set of SDUs, wherein the order of the respective set of SDUs is based at least in part on the respective SNs.

Aspect 18: The method of any of aspects 14 through 17, further comprising: identifying a respective plurality of length subheaders for each concatenated SDU of the two or more concatenated SDUs, each length subheader indicating a size of a corresponding SDU included in a respective concatenated SDU, wherein decoding the data is based at least in part on the respective plurality of length subheaders.

Aspect 19: The method of aspect 18, wherein each plurality of length subheaders is included in a header of a corresponding concatenated SDU.

Aspect 20: The method of aspect 18, wherein each length subheader of the respective plurality of length subheaders is located before the corresponding SDU included in the respective concatenated SDU.

Aspect 21: A first wireless device for wireless communications, comprising one or more memories storing processor-executable code, and one or more processors coupled with the one or more memories and individually or collectively operable to execute the code to cause the first wireless device to perform a method of any of aspects 1 through 13.

Aspect 22: A first wireless device for wireless communications, comprising at least one means for performing a method of any of aspects 1 through 13.

Aspect 23: A non-transitory computer-readable medium storing code for wireless communications, the code comprising instructions executable by one or more processors to perform a method of any of aspects 1 through 13.

Aspect 24: A first wireless device for wireless communications, comprising one or more memories storing processor-executable code, and one or more processors coupled with the one or more memories and individually or collectively operable to execute the code to cause the first wireless device to perform a method of any of aspects 14 through 20.

Aspect 25: A first wireless device for wireless communications, comprising at least one means for performing a method of any of aspects 14 through 20.

Aspect 26: A non-transitory computer-readable medium storing code for wireless communications, the code comprising instructions executable by one or more processors to perform a method of any of aspects 14 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:

one or more memories storing processor-executable code; and one or more processors coupled with the one or more memories and individually or collectively operable to execute the code to cause the first wireless device to:

identify a plurality of service data units at a packet data convergence protocol layer of the first wireless device, each service data unit associated with data for transmission to a second wireless device;

concatenate the plurality of service data units to obtain two or more concatenated service data units, wherein respective sets of service data units are concatenated using respective concatenation buffers of a plurality of concatenation buffers based at least in part on a configuration of each respective concatenation buffer, wherein the configuration of each respective concatenation buffer is associated with a respective value of a concatenation timer, a respective threshold service data unit size, or both; and transmit, to the second wireless device, one or more messages comprising the two or more concatenated service data units.

2. The first wireless device of claim 1, wherein, to concatenate the plurality of service data units, the one or more processors are individually or collectively operable to execute the processor-executable code to cause the first wireless device to: concatenate, via a first concatenation buffer, a first subset of service data units of the plurality of service data units to obtain a first concatenated service data unit; and concatenate, via a second concatenation buffer, a second subset of service data units of the plurality of service data units to obtain a second concatenated service data unit.

3. The first wireless device of claim 2, wherein:

the first concatenation buffer is associated with a first configuration of a first value of the concatenation timer, a first threshold service data unit size, or both, wherein the first subset of service data units is concatenated in accordance with the first configuration; and the second concatenation buffer is associated with a second configuration of a second value of the concatenation timer, a second threshold service data unit size, or both, the first value of the concatenation timer different from the second value of the concatenation timer and the first threshold service data unit size different from the second threshold service data unit size, wherein the second subset of service data units is concatenated in accordance with the second configuration.

4. The first wireless device of claim 2, wherein:

the first subset of service data units is concatenated via the first concatenation buffer based at least in part on both the first subset of service data units and the first concatenation buffer associated with a first quality of service flow, a first radio link control entity, or both; and the second subset of service data units is concatenated via the second concatenation buffer based at least in part on the second subset of service data units and the second concatenation buffer being associated with a second quality of service flow different from the first quality of service flow, a second radio link control entity different from the first radio link control entity, or both.

5. The first wireless device of claim 2, wherein the one or more processors are individually or collectively further operable to execute the processor-executable code to cause the first wireless device to: apply a first packet data convergence protocol header to the first concatenated service data unit after performing ciphering and integrity protection for the first concatenated service data unit, the first packet data convergence protocol header comprising a first sequence number associated with the first concatenated service data unit; and apply a second packet data convergence protocol header to the second concatenated service data unit after performing ciphering and integrity protection for the second concatenated service data unit, the second packet data convergence protocol header comprising a second sequence number associated with the first concatenated service data unit.

6. The first wireless device of claim 5, wherein a value of the first sequence number associated with the first concatenated service data unit is less than a value of the second sequence number associated with the second concatenated service data unit from the second concatenation buffer.

7. The first wireless device of claim 1, wherein the one or more processors are individually or collectively further operable to execute the processor-executable code to cause the first wireless device to: apply, prior to concatenating the plurality of service data units, a respective sequence number to each service data unit of the plurality of service data units, wherein each concatenated service data unit of the two or more concatenated service data units includes a set of respective sequence numbers corresponding to a set of service data units included in a respective concatenated service data unit.

8. The first wireless device of claim 1, wherein the one or more processors are individually or collectively further operable to execute the processor-executable code to cause the first wireless device to: append a respective plurality of length subheaders for each concatenated service data unit, each length subheader indicating a size of a corresponding service data unit included in a respective concatenated service data unit.

9. The first wireless device of claim 8, wherein each plurality of length subheaders is included in a header of a corresponding concatenated service data unit.

10. The first wireless device of claim 8, wherein each length subheader of the respective plurality of length subheaders is located before the corresponding service data unit included in the respective concatenated service data unit.

11. The first wireless device of claim 1, wherein the one or more processors are individually or collectively further operable to execute the processor-executable code to cause the first wireless device to: receive, when establishing a radio bearer with the second wireless device, a control message indicating the configuration of each respective concatenation buffer, wherein concatenating the plurality of service data units is based at least in part on receiving the control message.

12. The first wireless device of claim 1, wherein the one or more processors are individually or collectively further operable to execute the processor-executable code to cause the first wireless device to: receive one or more control messages indicating the configuration of each respective concatenation buffer, wherein concatenating the plurality of service data units is based at least in part on receiving the one or more control messages.

13. The first wireless device of claim 1, wherein the configuration of each respective concatenation buffer is based at least in part on a mapping between one or more concatenation parameters and a channel quality index value.

14. A first wireless device, comprising:

one or more memories storing processor-executable code; and one or more processors coupled with the one or more memories and individually or collectively operable to execute the code to cause the first wireless device to:

receive, from a second wireless device, one or more messages comprising two or more concatenated service data units, wherein each concatenated service data unit of the two or more concatenated service data units includes a respective plurality of service data units associated with data for the first wireless device, wherein the two or more concatenated service data units comprise a first concatenated service data unit indicating a first sequence number associated with a first plurality of service data units and a second concatenated service data unit indicating a second sequence number associated with a second plurality of service data units, the second sequence number different from the first sequence number; and decode the data for the first wireless device in accordance with an order of the respective plurality of service data units included in each concatenated service data unit and based at least in part on one or more sequence numbers included in each concatenated service data unit.

15. The first wireless device of claim 14, wherein, to receive the one or more messages, the one or more processors are individually or collectively operable to execute the processor-executable code to cause the first wireless device to: determine an order of the first concatenated service data unit and the second concatenated service data unit based at least in part on the first sequence number and the second sequence number, wherein the order of the respective plurality of service data units is based at least in part on the order of the first concatenated service data unit and the second concatenated service data unit.

16. The first wireless device of claim 15, wherein the order of the first concatenated service data unit and the second concatenated service data unit is based at least in part on the first concatenated service data unit being associated with a first quality of service flow and the second concatenated service data unit being associated with a second quality of service flow different from the first quality of service flow.

17. The first wireless device of claim 14, wherein the one or more processors are individually or collectively further operable to execute the processor-executable code to cause the first wireless device to: identify a respective plurality of length subheaders for each concatenated service data unit of the two or more concatenated service data units, each length subheader indicating a size of a corresponding service data unit included in a respective concatenated service data unit, wherein decoding the data is based at least in part on the respective plurality of length subheaders.

18. The first wireless device of claim 17, wherein each plurality of length subheaders is included in a header of a corresponding concatenated service data unit.

19. The first wireless device of claim 17, wherein each length subheader of the respective plurality of length subheaders is located before the corresponding service data unit included in the respective concatenated service data unit.

20. A method for wireless communications at a first wireless device, comprising:

identifying a plurality of service data units at a packet data convergence protocol layer of the first wireless device, each service data unit associated with data for transmission to a second wireless device;

concatenating the plurality of service data units to obtain two or more concatenated service data units, wherein respective sets of service data units are concatenated using respective concatenation buffers of a plurality of concatenation buffers based at least in part on a configuration of each respective concatenation buffer, wherein the configuration of each respective concatenation buffer is associated with a respective value of a concatenation timer, a respective threshold service data unit size, or both; and transmitting, to the second wireless device, one or more messages comprising the two or more concatenated service data units.

21. The method of claim 20, wherein concatenating the plurality of service data units comprises:

concatenating, via a first concatenation buffer, a first subset of service data units of the plurality of service data units to obtain a first concatenated service data unit; and concatenating, via a second concatenation buffer, a second subset of service data units of the plurality of service data units to obtain a second concatenated service data unit.

22. The method of claim 21, wherein:

the first concatenation buffer is associated with a first configuration of a first value of the concatenation timer, a first threshold service data unit size, or both, wherein the first subset of service data units is concatenated in accordance with the first configuration; and the second concatenation buffer is associated with a second configuration of a second value of the concatenation timer, a second threshold service data unit size, or both, the first value of the concatenation timer different from the second value of the concatenation timer and the first threshold service data unit size different from the second threshold service data unit size, wherein the second subset of service data units is concatenated in accordance with the second configuration.

23. The method of claim 21, wherein:

the first subset of service data units is concatenated via the first concatenation buffer based at least in part on both the first subset of service data units and the first concatenation buffer associated with a first quality of service flow, a first radio link control entity, or both; and the second subset of service data units is concatenated via the second concatenation buffer based at least in part on the second subset of service data units and the second concatenation buffer being associated with a second quality of service flow different from the first quality of service flow, a second radio link control entity different from the first radio link control entity, or both.

24. The method of claim 21, further comprising:

applying a first packet data convergence protocol header to the first concatenated service data unit after performing ciphering and integrity protection for the first concatenated service data unit, the first packet data convergence protocol header comprising a first sequence number associated with the first concatenated service data unit; and applying a second packet data convergence protocol header to the second concatenated service data unit after performing ciphering and integrity protection for the second concatenated service data unit, the second packet data convergence protocol header comprising a second sequence number associated with the first concatenated service data unit.

25. A method for wireless communications at a first wireless device, comprising:

receiving, from a second wireless device, one or more messages comprising two or more concatenated service data units, wherein each concatenated service data unit of the two or more concatenated service data units includes a respective plurality of service data units associated with data for the first wireless device, wherein the two or more concatenated service data units comprise a first concatenated service data unit indicating a first sequence number associated with a first plurality of service data units and a second concatenated service data unit indicating a second sequence number associated with a second plurality of service data units, the second sequence number different from the first sequence number; and decoding the data for the first wireless device in accordance with an order of the respective plurality of service data units included in each concatenated service data unit and based at least in part on one or more sequence numbers included in each concatenated service data unit.

26. The method of claim 25, wherein receiving the one or more messages comprises:

determining an order of the first concatenated service data unit and the second concatenated service data unit based at least in part on the first sequence number and the second sequence number, wherein the order of the respective plurality of service data units is based at least in part on the order of the first concatenated service data unit and the second concatenated service data unit.

27. The method of claim 26, wherein the order of the first concatenated service data unit and the second concatenated service data unit is based at least in part on the first concatenated service data unit being associated with a first quality of service flow and the second concatenated service data unit being associated with a second quality of service flow different from the first quality of service flow.

28. The method of claim 25, further comprising:

identifying a respective plurality of length subheaders for each concatenated service data unit of the two or more concatenated service data units, each length subheader indicating a size of a corresponding service data unit included in a respective concatenated service data unit, wherein decoding the data is based at least in part on the respective plurality of length subheaders.

29. The method of claim 21, further comprising:

appending a respective plurality of length subheaders for each concatenated service data unit, each length subheader indicating a size of a corresponding service data unit included in a respective concatenated service data unit.

30. The method of claim 29, wherein each plurality of length subheaders is included in a header of a corresponding concatenated service data unit.

* * * * *